(12) United States Patent
Hirano

(10) Patent No.: US 11,899,187 B2
(45) Date of Patent: Feb. 13, 2024

(54) IMAGING LENS

(71) Applicant: TOKYO VISIONARY OPTICS CO., LTD., Tokyo (JP)

(72) Inventor: Hitoshi Hirano, Tokyo (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 124 days.

(21) Appl. No.: 17/391,797

(22) Filed: Aug. 2, 2021

(65) Prior Publication Data

US 2021/0364760 A1 Nov. 25, 2021

Related U.S. Application Data

(63) Continuation of application No. 16/894,394, filed on Jun. 5, 2020, now Pat. No. 11,460,675.

(30) Foreign Application Priority Data

Aug. 16, 2019 (JP) ................................. 2019-149240

(51) Int. Cl.
*G02B 13/02* (2006.01)
*G02B 9/64* (2006.01)
*G02B 27/00* (2006.01)
*H04N 23/55* (2023.01)
*G02B 13/00* (2006.01)

(52) U.S. Cl.
CPC ............... *G02B 13/02* (2013.01); *G02B 9/64* (2013.01); *G02B 27/0025* (2013.01); *H04N 23/55* (2023.01); *G02B 13/0045* (2013.01)

(58) Field of Classification Search
None
See application file for complete search history.

(56) References Cited

U.S. PATENT DOCUMENTS

2017/0329108 A1  11/2017  Hashimoto
2019/0204557 A1   7/2019  Jhang et al.

FOREIGN PATENT DOCUMENTS

JP        2017-116594 A    6/2017

*Primary Examiner* — Stephone B Allen
*Assistant Examiner* — Tamara Y. Washington
(74) *Attorney, Agent, or Firm* — Hamre, Schumann, Mueller & Larson, P.C.

(57) ABSTRACT

There is provided a compact imaging lens configured to properly correct aberrations. The imaging lens includes, in order from an object side to an image side, a first lens L1 with positive refractive power, a second lens L2 with negative refractive power, a third lens L3 with positive refractive power, a fourth lens L4 with positive refractive power, a fifth lens L5, a sixth lens L6, a seventh lens L7 with positive refractive power, and an eighth lens L8 with negative refractive power. The eighth lens L8 is formed in a shape of a meniscus lens in a paraxial region, and has an aspheric image-side surface having at least one inflection point. In addition, the following conditional expressions are satisfied:

$$-5.00 < f2/f < -2.00$$

$$10.00 < f4/f < 25.00$$

where
f: a focal length of the overall optical system of the imaging lens,
f2: a focal length of the second lens, and
f4: a focal length of the fourth lens.

6 Claims, 10 Drawing Sheets

Example 1

Example 1

Example 2

Example 3

Example 4

Example 5

IMAGING LENS

BACKGROUND OF THE INVENTION AND RELATED ART STATEMENT

The present invention relates to an imaging lens for forming an image of an object on an image sensor such as a CCD sensor and a CMOS sensor. Particularly, the present invention relates to an imaging lens suitable for mounting in a relatively small camera to be built in portable devices such as cellular phones and portable information terminals, digital still cameras, security cameras, onboard cameras and network cameras, and so on.

To take a picture of an object with high definition or acquire more information on the object, the camera has to have a high-resolution imaging lens as well as an image sensor with high pixel count. As a method for achieving higher resolution of an imaging lens, there is a method of increasing the number of lenses that compose the imaging lens in accordance with the difficulty of correcting aberrations.

A lens configuration including eight lenses has, due to the large number of lenses of the imaging lens, high flexibility in design and thus allows proper correction of aberrations. As the imaging lens having the eight-lens configuration, for example, an imaging lens described in Patent Document 1 has been known.

Patent Document 1 (JP Application Publication No. 2017-116594) discloses an imaging lens comprising a first lens with positive refractive power having a convex object-side surface, a second lens, a third lens, a fourth lens, a fifth lens, a sixth lens, a seventh lens with negative refractive power, and an eighth lens with the negative refractive power having a concave image-side surface.

According to the conventional imaging lens of Patent Document 1, aberrations can be relatively properly corrected. However, a total track length which is long relative to the focal length of the overall optical system of the imaging lens is provided, it is unsatisfactory for downsizing and achieving a low profile of the imaging lens for mounting in a small camera to be built in a thin device such as a smartphone. In the case of the conventional imaging lens described in Patent Document 1, it is difficult to achieve more proper correction of aberrations while further downsizing and achieving the low profile of the imaging lens.

Such a problem is not specific to the imaging lens to be mounted in smartphones. Rather, it is a common problem for imaging lenses to be mounted in a relatively small camera to be built in cellular phones and portable information terminals, digital still cameras, security cameras, onboard cameras, network cameras and the like.

An object of the present invention is to provide an imaging lens that can achieve both downsizing of the imaging lens and proper correction of aberrations.

SUMMARY OF THE INVENTION

An imaging lens according to the present invention forms an image of an object on an image sensor and comprises, in order from an object side to an image side, a first lens with positive refractive power, a second lens with negative refractive power, a third lens with positive refractive power, a fourth lens with positive refractive power, a fifth lens, a sixth lens, a seventh lens with positive refractive power, and an eighth lens with negative refractive power. The eighth lens has an aspheric image-side surface having at least one inflection point.

In the imaging lens according to the present invention, the second lens with the negative refractive power is arranged on an image side of the first lens with the positive refractive power. Thereby, chromatic aberration can be properly corrected while preferably reducing a profile of the imaging lens. The third lens has the positive refractive power, and configuration of refractive power of the first lens to the third lens becomes positive-negative-positive. Therefore, the chromatic aberration can be properly corrected for wavelengths in a wide range. Furthermore, by arranging a lens with positive refractive power as the fourth lens, the positive refractive power is shared between the third lens and the fourth lens, and the refractive powers of these two lenses are suppressed from being large. As a result, a thickness of a center and a thickness of a peripheral area of the third lens can be preferably suppressed from being increased, and aberrations can be properly corrected.

Furthermore, in the imaging lens according to the present invention, the eighth lens with the negative refractive power is arranged on an image side of the seventh lens with the positive refractive power. Providing such a configuration of the refractive power, axial chromatic aberration and chromatic aberration of magnification can be properly corrected. When the image-side surface of the eighth lens is formed as the aspheric surface having at least one inflection point, a back focus can be secured, and field curvature and distortion at an image periphery can be properly corrected. According to such a shape of the eighth lens, it is also possible to control an incident angle of a light ray emitted from the imaging lens to the image plane of the image sensor within the range of chief ray angle (CRA), and to properly correct the aberrations in a paraxial region and at the peripheral area.

Regarding terms used in the present invention, "lens" refers to an optical element having refractive power. Therefore, the term "lens" used herein does not include the optical element such as a prism changing a traveling direction of a light, a flat filter, and the like. Those optical elements may be arranged in front of or behind the imaging lens, or between respective lenses, as necessary.

According to the imaging lens having the above-described configuration, it is preferable that the following conditional expression (1) is satisfied:

$$-5.00 < f2/f < -2.00 \tag{1}$$

where
f: a focal length of the overall optical system of the imaging lens, and
f2: a focal length of the second lens.

By satisfying the conditional expression (1), reduction in the profile of the imaging lens can be achieved, and the chromatic aberration can be properly corrected.

According to the imaging lens having the above-described configuration, it is preferable that the following conditional expression (2) is satisfied:

$$10.00 < f4/f < 25.00 \tag{2}$$

where
f: a focal length of the overall optical system of the imaging lens, and
f4: a focal length of the fourth lens.

By satisfying the conditional expression (2), the reduction in the profile of the imaging lens can be achieved, and spherical aberration and the field curvature can be properly corrected.

According to the imaging lens having the above-described configuration, it is preferable that the following conditional expression (3) is satisfied:

$$1.20 < f3/f1 < 5.50 \tag{3}$$

where
f1: a focal length of the first lens, and
f3: a focal length of the third lens.

By satisfying the conditional expression (3), reduction in the profile of the imaging lens can be achieved, and the spherical aberration and the field curvature can be properly corrected.

According to the imaging lens having the above-described configuration, it is preferable that the following conditional expression (4) is satisfied:

$$1.50 < f3/f < 5.00 \tag{4}$$

where
f: a focal length of the overall optical system of the imaging lens, and
f3: a focal length of the third lens.

By satisfying the conditional expression (4), the reduction in the profile of the imaging lens can be achieved, and the spherical aberration and the field curvature can be properly corrected.

According to the imaging lens having the above-described configuration, it is preferable that the third lens is formed in a shape having an image-side surface being concave in the paraxial region.

When the third lens is formed in such a shape, an incident angle of a lower light ray to the image plane in a higher position of an image height can be suppressed from being increased, and the field curvature, coma aberration, total reflection light, and the like can be properly corrected.

According to the imaging lens having the above-described configuration, it is preferable that the following conditional expression (5) is satisfied:

$$1.50 < f34/f < 3.50 \tag{5}$$

where
f34: a composite focal length of the third lens and the fourth lens, and
f: a focal length of the overall optical system of the imaging lens.

By satisfying the conditional expression (5), the reduction in the profile of the imaging lens can be achieved, and the spherical aberration and the field curvature can be properly corrected.

According to the imaging lens having the above-described configuration, it is preferable that the following conditional expression (6) is satisfied:

$$0.030 < D34/f < 0.100 \tag{6}$$

where
D34: a distance along the optical axis between the third lens and the fourth lens, and
f: a focal length of the overall optical system of the imaging lens.

By satisfying the conditional expression (6), a wide field of view of the imaging lens can be achieved and the back focus can be secured.

According to the imaging lens having the above-described configuration, it is preferable that the following conditional expression (7) is satisfied:

$$0.50 < D45/D34 < 4.00 \tag{7}$$

where
D34: a distance along the optical axis between the third lens and the fourth lens, and
D45: a distance along the optical axis between the fourth lens and the fifth lens.

By satisfying the conditional expression (7), both reduction in the profile and the wide field of view of the imaging lens can be preferably achieved.

According to the imaging lens having the above-described configuration, it is preferable that the following conditional expression (8) is satisfied:

$$-8.00 < f56/f < -0.50 \tag{8}$$

where
f: a focal length of the overall optical system of the imaging lens, and
f56: a composite focal length of the fifth lens and the sixth lens.

By satisfying the conditional expression (8), the chromatic aberration and the field curvature can be properly corrected in well balance.

According to the imaging lens having the above-described configuration, it is preferable that the sixth lens is formed in a shape having an object-side surface being concave in the paraxial region. When the sixth lens is formed in such a shape, an incident angle of a light ray to the image plane in each image height can be suppressed from being increased, and the field curvature, total reflection light, and the like can be properly corrected.

According to the imaging lens having the above-described configuration, it is preferable that the following conditional expression (9) is satisfied:

$$1.40 < f7/f < 4.50 \tag{9}$$

where
f: a focal length of the overall optical system of the imaging lens, and
f7: a focal length of the seventh lens.

By satisfying the conditional expression (9), the reduction in the profile of the imaging lens can be achieved, and the spherical aberration and the distortion can be properly corrected.

According to the imaging lens having the above-described configuration, it is preferable that the following conditional expression (10) is satisfied:

$$0.30 < T7/T8 < 1.50 \tag{10}$$

where
T7: a thickness along the optical axis of the seventh lens, and
T8: a thickness along the optical axis of the eighth lens.

When the reduction in the profile of the imaging lens is achieved, a lens arranged in a position closer to the image plane tends to have a greater effective diameter. When the conditional expression (10) is satisfied, thicknesses along the optical axis of the seventh lens and the eighth lens that are likely to have relatively large effective diameters are properly maintained. It is thus possible to properly correct aberrations while reducing the profile of the imaging lens. It is also possible to secure the back focus. When the seventh lens and the eighth lens are formed from a plastic material, it is possible to reduce manufacturing costs of the lenses and also to secure the formability of the lenses by satisfying the conditional expression (10).

According to the imaging lens having the above-described configuration, it is preferable that the following conditional expression (11) is satisfied:

$$-2.00 < f8/f7 < -0.30 \tag{11}$$

where f7: a focal length of the seventh lens, and
f8: a focal length of the eighth lens.

When the conditional expression (11) is satisfied, the spherical aberration, the field curvature and the chromatic aberration of magnification can be properly corrected in a favorable range in well balance.

According to the imaging lens having the above-described configuration, it is preferable that the eighth lens is formed in a shape that curvature radii of an object-side surface and an image-side surface are both positive, that is, a shape of a meniscus lens having the image-side surface being concave in the paraxial region. When the eighth lens is formed in such a shape, the reduction in the profile of the imaging lens can be achieved, and the spherical aberration, the field curvature and the distortion can be properly corrected.

According to the imaging lens having the above-described configuration, it is preferable that the following conditional expression (12) is satisfied:

$$1.00 < R8f/R8r < 2.50 \quad (12)$$

where

R8f: a curvature radius of an object-side surface of the eighth lens, and
R8r: a curvature radius of an image-side surface of the eighth lens.

By satisfying the conditional expression (12), the field curvature and the distortion can be properly corrected.

According to the imaging lens having the above-described configuration, the third lens and the fourth lens have positive refractive power. It is preferable that the following conditional expressions (13) and (14) are satisfied for more properly correcting the chromatic aberration:

$$35 < vd3 \quad (13)$$

$$35 < vd4 \quad (14)$$

where vd3: an abbe number at d-ray of the third lens, and
vd4: an abbe number at d-ray of the fourth lens.

According to the imaging lens having the above-described configuration, it is further preferable that the following conditional expressions (13a) and (14a) are satisfied:

$$35 < vd3 < 90 \quad (13a)$$

$$35 < vd4 < 90. \quad (14a)$$

According to the imaging lens having the above-described configuration, it is preferable that the following conditional expressions (15) and (16) are satisfied for more properly correcting the axial chromatic aberration and the chromatic aberration of magnification:

$$35 < vd7 \quad (15)$$

$$35 < vd8 \quad (16)$$

where vd7: an abbe number at d-ray of the seventh lens, and
vd8: an abbe number at d-ray of the eighth lens.

According to the imaging lens having the above-described configuration, it is further preferable that the following conditional expressions (15a) and (16a) are satisfied:

$$35 < vd7 < 90 \quad (15a)$$

$$35 < vd8 < 90. \quad (16a)$$

According to the imaging lens having the above-described configuration, it is preferable that the following conditional expression (17) is satisfied:

$$TL/f < 1.3 \quad (17)$$

where f: a focal length of the overall optical system of the imaging lens, and
TL: a distance along the optical axis from an object-side surface of the first lens to an image plane.

By satisfying the conditional expression (17), downsizing of the imaging lens can be preferably achieved.

Generally, an IR cut filter, a cover glass or the like are arranged between the imaging lens and the image plane, however a distance thereof along the optical axis is converted into an air-converted distance in the present specification.

In the case of an imaging lens to be built in a thin portable device, such as the smartphone, an imaging lens has to be contained in a limited space. Therefore, there is often a strict limitation in a length of the imaging lens in the direction of the optical axis relative to the size of the image sensor. That is, a low profile of the imaging lens is strongly expected. Therefore, according to the imaging lens of the present invention, it is preferable that the following conditional expression (18) is satisfied:

$$1.00 < TL/Hmax < 1.55 \quad (18)$$

where

TL: a distance along the optical axis from an object-side surface of the first lens to an image plane, and
Hmax: a maximum image height.

According to the imaging lens of the present invention, it is preferable that each lens of the first to the eighth lenses is arranged with an air gap. When each lens is arranged with an air gap, the imaging lens according to the present invention has a lens configuration without any cemented lenses. According to such lens configuration, all of eight lenses composing the imaging lens can be formed from a plastic material and the manufacturing cost of the imaging lens can be preferably reduced.

According to the imaging lens of the present invention, it is preferable that both surfaces of each lens of the first to the eighth lenses are formed as aspheric surfaces. When the both surfaces of each lens are formed as aspheric surfaces, aberrations from the paraxial region to a peripheral area of the lens can be properly corrected. Particularly, the aberrations at the peripheral area of the lens can be properly corrected.

According to the imaging lens having the above-described configuration, it is preferable that at least two surfaces of the seventh lens and the eighth lens are formed as the aspheric surfaces having at least one inflection point. In addition to the image-side surface of the eighth lens, when one more aspheric surface having at least one inflection point is provided, it is also possible to preferably control an incident angle of a light ray emitted from the imaging lens to the image plane within the range of chief ray angle (CRA), and to properly correct the aberrations at image periphery.

According to the imaging lens of the present invention, when a field of view is shown as 2ω, it is preferable that a conditional expression, 70°≤2ω is satisfied. When this conditional expression is satisfied, the wide field of view of the imaging lens can be achieved. As a result, the downsizing and the wide field of view of the imaging lens can be both preferably achieved.

According to the present invention, as described above, the shapes of the lenses are specified using signs of the curvature radii. Whether the curvature radius of the lens is positive or negative is determined based on general definition. More specifically, taking a traveling direction of the light as positive, if a center of a curvature radius is on the image side when viewed from a lens surface, the curvature radius is positive. If a center of a curvature radius is on the object side, the curvature radius is negative. Therefore, "an object-side surface having a positive curvature radius" means that the object-side surface is a convex surface. "An object-side surface having a negative curvature radius" means that the object side surface is a concave surface. In addition, "an image-side surface having a positive curvature radius" means that the image-side surface is a concave surface. "An image-side surface having a negative curvature radius" means that the image-side surface is a convex surface. Here, a curvature radius used herein refers to a paraxial curvature radius, and may not be consistent with general shapes of the lenses in their sectional views.

According to the imaging lens of the present invention, it is achievable to provide a compact imaging lens especially suitable for mounting in a small-sized camera, while having high resolution with proper correction of aberrations.

DETAILED DESCRIPTION OF EMBODIMENTS

Hereunder, referring to the accompanying drawings, an embodiment of the present invention will be fully described.

FIGS. 1, 4, 7, 10 and 13 are schematic sectional views of the imaging lenses in Examples 1 to 5 according to the embodiment, respectively. Since the imaging lenses in those Examples have the same basic configuration, the lens configuration of the embodiment will be described with reference to the illustrative sectional view of Example 1.

Figure 1:
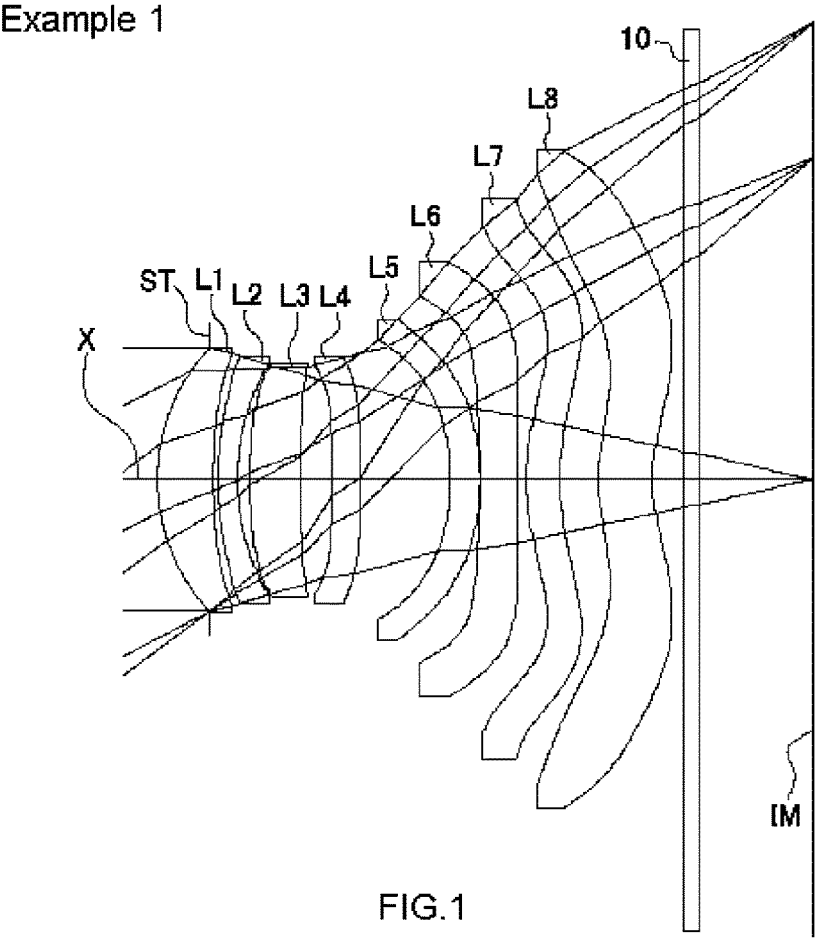
FIG. 1 is a sectional view of a schematic configuration of an imaging lens in Example 1 of the present invention.

As shown in FIG. 1, the imaging lens according to the present embodiment comprises, in order from an object side to an image side, a first lens L1 with positive refractive power, a second lens L2 with negative refractive power, a third lens L3 with positive refractive power, a fourth lens L4 with positive refractive power, a fifth lens L5, a sixth lens L6, a seventh lens L7 with positive refractive power, and an eighth lens L8 with negative refractive power. Each lens of the first lens L1 to the eighth lens L8 is arranged with an air gap. A filter 10 is arranged between the eighth lens L8 and an image plane IM of an image sensor. The filter 10 is omissible.

The first lens L1 has a shape that a curvature radius r2 of an object-side surface and a curvature radius r3 of an image-side surface are both positive. The first lens L1 is formed in a shape of a meniscus lens having the object-side surface being convex in the paraxial region. The shape of the first lens L1 is not limited to that in Example 1. The shape of the first lens L1 may be formed in any shape, as long as refractive power of the first lens L1 is positive. Other than the shape of the Example 1, the first lens L1 may be formed in a shape that the curvature radii r2 and r3 are both negative or a shape that the curvature radius r2 is positive and the curvature radius r3 is negative. The lens having the former shape is the meniscus lens having the object-side surface being concave in the paraxial region, and the lens having the latter shape is a biconvex lens in the paraxial region. It is preferable that the curvature radius r2 is positive from the standpoint of downsizing of the imaging lens.

In Example 1, an aperture stop ST is disposed on the object side of the first lens LL A location of the aperture stop ST is not limited to that in Example 1. The aperture stop ST may be disposed between the first lens L1 and the second lens L2, or between the second lens L2 and the third lens L3. Otherwise, the aperture stop ST may be disposed between the third lens L3 and the fourth lens L4, between the fourth lens L4 and the fifth lens L5, or the like.

The second lens L2 has a shape that a curvature radius r4 of an object-side surface and a curvature radius r5 of an image-side surface are both positive. The second lens L2 is formed in a shape of the meniscus lens having the object-side surface being convex in the paraxial region. The shape of the second lens L2 is not limited to that in Example 1. The shape of the second lens L2 may be formed in any shape, as long as refractive power of the second lens L2 is negative. Other than the shape of the Example 1, the second lens L2 may be formed in a shape that the curvature radii r4 and r5 are both negative, that is, a shape of a meniscus lens having the object-side surface being concave in the paraxial region, or a shape that the curvature radius r4 is negative and the curvature radius r5 is positive, that is, a shape of a biconcave lens in the paraxial region. It is preferable that the curvature radius r4 is positive from the standpoint of downsizing of the imaging lens.

The third lens L3 has a shape that a curvature radius r6 of an object-side surface and a curvature radius r7 of an image-side surface are both positive. The third lens L3 is formed in a shape of the meniscus lens having the object-side surface being convex in the paraxial region. Furthermore, the third lens L3 is formed in a shape having a concave surface facing the fourth lens L4 at a peripheral area of the lens. The shape of the third lens L3 is not limited to that in Example 1. The shape of the third lens L3 may be formed in any shape, as long as refractive power of the third lens L3 is positive. Other than the shape of the Example 1, the third lens L3 may be formed in a shape that the curvature radii r6 and r7 are both negative, or a shape that the curvature radius r6 is positive and the curvature radius r7 is negative. The lens having the former shape is the meniscus lens having the object-side surface being concave in the paraxial region, and the lens having the latter shape is a biconvex lens in the paraxial region. It is preferable that the curvature radius r6 is positive from the standpoint of downsizing of the imaging lens.

The fourth lens L4 is formed in a shape that a curvature radius r8 of an object-side surface and a curvature radius r9 of an image-side surface are both positive. The fourth lens L4 is formed in a shape of the meniscus lens having the object-side surface being convex in the paraxial region. In addition, the fourth lens L4 is formed in a shape having a concave surface facing the third lens at a peripheral area of the lens. Therefore, the above-mentioned third lens L3 and the fourth lens L4 are arranged in a manner that the concave surfaces of the third lens L3 and the fourth lens L4 are faced each other at the peripheral area of the lenses, and the field curvature and the astigmatism can be properly corrected.

The shape of the fourth lens L4 is not limited to that in Example 1. The fourth lens L4 may be formed in any shape, as long as refractive power of the fourth lens L4 is positive. Example 2 shows a shape that the curvature radius r8 is positive and the curvature radius r9 is negative, that is, a shape of the biconvex lens in the paraxial region. The Example 3 shows a shape that the curvature radii r8 and r9 are both negative, that is, a shape of the meniscus lens having the object-side surface being concave in the paraxial region.

The fifth lens L5 has positive refractive power. The refractive power of the fifth lens L5 is not limited to the positive refractive power. Examples of the lens configuration that the refractive power of the fifth lens L5 is negative are shown in Examples 2, 3 and 5. In addition, an example of the fifth lens L5 that the refractive power becomes zero in the paraxial region is shown in Example 4.

The fifth lens L5 is formed in a shape that a curvature radius r10 of an object-side surface and a curvature radius r11 of an image-side surface are both negative. The fifth lens L5 is formed in a shape of the meniscus lens having the object-side surface being concave in the paraxial region. The shape of the fifth lens L5 is not limited to that in Example 1. Example 3 shows a shape that the curvature radius r10 is negative and the curvature radius r11 is positive, that is, the biconcave lens in the paraxial region. In addition, the fifth lens L5 may be formed in a shape that the curvature radius r10 and the curvature radius r11 are both positive, or a shape that the curvature radius r10 is positive and the curvature radius r11 is negative. The lens having the former shape is the meniscus lens having the object-side surface being convex in the paraxial region, and the lens having the latter shape is a biconvex lens in the paraxial region. Example 4 shows a shape that the curvature radii r10 and r11 are both infinities in the paraxial region. In this case, the fifth lens L5 has no refractive power in the paraxial region, but has the refractive power at the peripheral area of the lens. Such type of the lens, the fifth lens L5 is suitable for correcting aberrations at the peripheral area of the lens.

The sixth lens L6 has negative refractive power. The refractive power of the sixth lens L6 is not limited to the negative. An example of the lens configuration that the refractive power of the sixth lens L6 is positive is shown in Example 2. Additionally, an example of the lens configuration that the refractive power of the sixth lens L6 is zero in the paraxial region is shown in Example 5.

The sixth lens L6 is formed in a shape that a curvature radius r12 of an object-side surface and a curvature radius r13 of an image-side surface are both negative. The sixth lens L6 is formed in a shape of the meniscus lens having the object-side surface being concave in the paraxial region. The shape of the sixth lens L6 is not limited to that in Example 1. Other than the shape of Example 1, the sixth lens L6 may be formed in a shape that the curvature radii r12 and r13 are both positive, or a shape that the curvature radius r12 is positive and the curvature radius r13 is negative. The lens having the former shape is the meniscus lens having the object-side surface being convex in the paraxial region, and the lens having the latter shape is the biconvex lens in the paraxial region. Furthermore, the sixth lens L6 may be formed in a shape that the curvature radius r12 is negative and the curvature radius r13 is positive, that is, a shape of the biconcave lens in the paraxial region. Example 5 shows a shape that the curvature radii r12 and r13 are both infinities in the paraxial region. In this case, the sixth lens L6 has no refractive power in the paraxial region, but has the refractive power at the peripheral area of the lens. Such type of the lens, the sixth lens L6 is suitable for correcting aberrations at the peripheral area of the lens.

The seventh lens L7 is formed in a shape that a curvature radius r14 of an object-side surface and a curvature radius r15 of an image-side surface are both positive. The seventh lens L7 is formed in a shape of the meniscus lens having the object-side surface being convex in the paraxial region. The shape of the seventh lens L7 is not limited to that in Example 1. The seventh lens L7 may be formed in a shape that the curvature radii r14 and r15 are both negative, that is, a shape of the meniscus lens having the object-side surface being concave in the paraxial region. Other than such shapes, the seventh lens L7 may be formed in a shape that the curvature radius r14 is positive and the curvature radius r15 is negative, that is, a shape of the biconvex lens in the paraxial region. In short, the seventh lens L7 may be formed in a shape having the positive refractive power.

The eighth lens L8 is formed in a shape that a curvature radius r16 (=R8f) of an object-side surface and a curvature radius r17 (=R8r) of an image-side surface are both positive. The eighth lens L8 is formed in a shape of the meniscus lens having the object-side surface being convex in the paraxial region. The shape of the eighth lens L8 is not limited to that in Example 1. The shape of the eighth lens L8 may be a shape that the curvature radius r16 is negative and the curvature radius r17 is positive, that is, a shape of the biconcave lens in the paraxial region. Other than such shapes, the eighth lens L8 may be formed in a shape that the curvature radii r16 and r17 are both negative. Furthermore, the eighth lens L8 may be formed in a shape that refractive power of the eighth lens L8 is negative.

Regarding the eighth lens L8, the image-side surface is formed as an aspheric surface having at least one inflection point. Here, the "inflection point" means a point where the positive/negative sign of a curvature changes on the curve, i.e., a point where a direction of curving of the curve on the lens surface changes. The image-side surface of the eighth lens L8 of the imaging lens according to the present embodiment is the aspheric surface having at least one pole. With such shape of the eighth lens L8, an off-axial chromatic aberration of magnification as well as an axial chromatic aberration can be properly corrected, and an incident angle of a light ray emitted from the imaging lens to the image plane IM can be preferably controlled within the range of chief ray angle (CRA). Regarding the imaging lens according to Example 1, both surfaces of the seventh lens L7 and the eighth lens L8 are formed as the aspheric surfaces each of which has at least one inflection point. Therefore, aberrations at an image periphery more properly corrected. Depending on the required optical performance and extent of downsizing of the imaging lens, among lens surfaces of the seventh lens L7 and the eighth lens L8, lens surfaces other than the image-side surface of the eighth lens L8 may be formed as an aspheric surface without the inflection point.

According to the embodiment, the imaging lens satisfies the following conditional expressions (1) to (18):

$$-5.00 < f2/f < -2.00 \tag{1}$$

$$10.00 < f4/f < 25.00 \tag{2}$$

$$1.20 < f3/f1 < 5.50 \tag{3}$$

$$1.50 < f3/f < 5.00 \tag{4}$$

$$1.50 < f34/f < 3.50 \tag{5}$$

$$0.030 < D34/f < 0.100 \tag{6}$$

$$0.50 < D45/D34 < 4.00 \tag{7}$$

$$-8.00 < f56/f < -0.50 \tag{8}$$

$$1.40 < f7/f < 4.50 \tag{9}$$

$$0.30 < T7/T8 < 1.50 \tag{10}$$

$$-2.00 < f8/f7 < -0.30 \tag{11}$$

$$1.00 < R8f/R8r < 2.50 \tag{12}$$

$$35 < vd3 \tag{13}$$

$$35 < vd3 < 90 \tag{13a}$$

$$35 < vd4 \tag{14}$$

$$35 < vd4 < 90 \tag{14a}$$

$$35 < vd7 \tag{15}$$

$$35 < vd7 < 90 \tag{15a}$$

$$35 < vd8 \tag{16}$$

$$35 < vd8 < 90 \tag{16a}$$

$$TL/f < 1.3 \tag{17}$$

$$1.00 < TL/Hmax < 1.55 \tag{18}$$

where
f: a focal length of the overall optical system of the imaging lens,
f1: a focal length of the first lens L1,
f2: a focal length of the second lens L2,
f3: a focal length of the third lens L3,
f4: a focal length of the fourth lens L4,
f7: a focal length of the seventh lens L7,
f8: a focal length of the eighth lens L8, f34: a composite focal length of the third lens L3 and the fourth lens L4, f56: a composite focal length of the fifth lens L5 and the sixth lens L6, T7: a thickness along the optical axis X of the seventh lens L7, T8: a thickness along the optical axis X of the eighth lens L8, vd3: an abbe number at d-ray of the third lens L3, vd4: an abbe number at d-ray of the fourth lens L4, vd7: an abbe number at d-ray of the seventh lens L7, vd8: an abbe number at d-ray of the eighth lens L8, R8f: a curvature radius of an object-side surface of the eighth lens L8, R8r: a curvature radius of an image-side surface of the eighth lens L8, D34: a distance along the optical axis X between the third lens L3 and the fourth lens L4, D45: a distance along the optical axis X between the fourth lens L4 and the fifth lens L5, Hmax: a maximum image height, and TL: a distance along the optical axis X from an object-side surface of the first lens L1 to an image plane IM (Filter 10 is an air-converted distance).

The imaging lens according to the present embodiment satisfies the following conditional expression.

$$70° \leq 2\omega$$

It is not necessary to satisfy the above all conditional expressions, and when any one of the conditional expressions is individually satisfied, operational advantage corresponding to each conditional expression can be obtained. According to the present embodiment, lens surfaces of the respective lenses are formed as aspheric surfaces. An equation that expresses these aspheric surfaces is shown below:

$$Z = \frac{C \cdot H^2}{1 + \sqrt{1-(1+k) \cdot C^2 \cdot H^2}} + \sum (An \cdot H^n) \qquad [\text{Equation 1}]$$

where
Z: a distance in a direction of the optical axis,
H: a distance from the optical axis in a direction perpendicular to the optical axis,
C: a paraxial curvature (=1/r, r: a paraxial curvature radius),
k: conic constant, and
An: the nth aspheric coefficient.

Next, examples of the imaging lens according to the present embodiment will be described. In each example, f represents a focal length of the overall optical system of the imaging lens, Fno represents an F-number, ω represents a half field of view. Additionally, i represents a surface number counted from the object side, r represents a paraxial curvature radius, d represents a distance of lenses along the optical axis (surface distance), nd represents a refractive index at a reference wavelength of 588 nm, and vd represents an abbe number at the reference wavelength, respectively. Here, surfaces indicated with surface numbers i affixed with an asterisk (*) are aspheric surfaces.

Example 1

The basic lens data is shown below in Table 1.

TABLE 1

| | | | f = 7.79 mm Fno = 2.3 ω = 36.7° | | | |
|---|---|---|---|---|---|---|
| | i | r | d | n d | v d | [mm] |
| ST | 1 | ∞<br>∞ | ∞<br>−0.657 | | | |
| L1 | 2*<br>3* | 2.525<br>7.235 | 0.722<br>0.053 | 1.5445 | 56.4 | f1 = 6.758 |
| L2 | 4*<br>5* | 3.637<br>2.696 | 0.249<br>0.166 | 1.6707 | 19.2 | f2 = −17.369 |
| L3 | 6*<br>7* | 7.756<br>15.075 | 0.649<br>0.401 | 1.5445 | 56.4 | f3 = 28.452 |
| L4 | 8*<br>9* | 34.510<br>92.127 | 0.368<br>1.153 | 1.5445 | 56.4 | f4 = 101.122 |
| L5 | 10*<br>11* | −4.201<br>−4.104 | 0.390<br>0.010 | 1.6707 | 19.2 | f5 = 101.196 |
| L6 | 12*<br>13* | −6.280<br>−94.242 | 0.476<br>0.114 | 1.5348 | 55.7 | f6 = −12.605 |
| L7 | 14*<br>15* | 3.147<br>3.979 | 0.432<br>0.496 | 1.5348 | 55.7 | f7 = 23.834 |
| L8 | 16*<br>17* | 2.554<br>2.058 | 0.692<br>0.400 | 1.5348 | 55.7 | f8 = −38.617 |
| | 18 | ∞ | 0.210 | 1.5168 | 64.2 | |
| (IM) | 19 | ∞ | 1.458 | | | | f34=22.394 mm
f56=−13.809 mm
R8f=2.554 mm
R8r=2.058 mm
D34=0.401 mm
D45=1.153 mm
T7=0.432 mm
T8=0.692 mm
TL=8.367 mm
Hmax=5.8 mm

TABLE 2

Aspheric Surface Data

| i | k | A4 | A6 | A8 | A10 |
|---|---|---|---|---|---|
| 2 | −6.427E−01 | 3.470E−03 | 5.278E−03 | −4.777E−05 | −6.501E−03 |
| 3 | 0.000E+00 | −2.198E−02 | 4.677E−02 | −3.543E−02 | 8.898E−03 |
| 4 | −1.244E+00 | −4.584E−02 | 5.237E−02 | −4.230E−02 | 1.407E−02 |
| 5 | −2.929E+00 | −5.263E−03 | 1.572E−02 | −3.369E−02 | 5.846E−02 |
| 6 | 0.000E+00 | 2.007E−02 | −1.691E−02 | 3.026E−02 | −2.197E−02 |
| 7 | 0.000E+00 | −9.613E−03 | 2.763E−02 | −5.736E−02 | 7.226E−02 |
| 8 | 0.000E+00 | −4.623E−02 | 1.852E−03 | −1.178E−02 | 1.435E−02 |
| 9 | 0.000E+00 | −4.072E−02 | 9.772E−03 | −8.858E−03 | −6.631E−03 |
| 10 | 0.000E+00 | −8.503E−02 | 4.128E−02 | −1.838E−02 | −1.121E−03 |
| 11 | 0.000E+00 | −7.198E−02 | 4.719E−02 | −2.654E−02 | 4.915E−03 |
| 12 | 0.000E+00 | 4.102E−02 | −6.959E−04 | −1.361E−02 | 8.036E−03 |
| 13 | 0.000E+00 | −7.224E−03 | 1.635E−02 | −9.934E−03 | 2.415E−03 |
| 14 | −1.109E+00 | −2.900E−02 | 1.039E−02 | −6.615E−03 | 2.216E−03 |
| 15 | 0.000E+00 | −5.256E−03 | −2.200E−03 | −1.527E−03 | 7.353E−04 |
| 16 | −1.275E+00 | −1.006E−01 | 3.089E−02 | −7.606E−03 | 1.256E−03 |
| 17 | −4.853E+00 | −4.815E−02 | 1.257E−02 | −2.652E−03 | 3.708E−04 |

| i | A12 | A14 | A16 | A18 | A20 |
|---|---|---|---|---|---|
| 2 | 8.264E−03 | −4.945E−03 | 1.615E−03 | −2.744E−04 | 1.848E−05 |
| 3 | 8.257E−03 | −8.520E−03 | 3.503E−03 | −7.274E−04 | 6.203E−05 |
| 4 | 6.559E−03 | −8.389E−03 | 3.500E−03 | −7.015E−04 | 5.736E−05 |
| 5 | −6.357E−02 | 4.277E−02 | −1.698E−02 | 3.635E−03 | −3.197E−04 |
| 6 | 3.313E−03 | 6.611E−03 | −4.783E−03 | 1.317E−03 | −1.333E−04 |
| 7 | −5.140E−02 | 1.908E−02 | −2.166E−03 | −6.619E−04 | 1.666E−04 |
| 8 | −9.408E−03 | 1.189E−03 | 2.114E−03 | −1.168E−03 | 1.897E−04 |
| 9 | 1.910E−02 | −1.664E−02 | 7.490E−03 | −1.749E−03 | 1.690E−04 |
| 10 | 6.950E−03 | −4.010E−03 | 1.009E−03 | −1.015E−04 | 7.992E−07 |
| 11 | 3.377E−03 | −2.488E−03 | 6.953E−04 | −9.305E−05 | 4.947E−06 |
| 12 | −2.654E−03 | 5.705E−04 | −8.147E−05 | 6.843E−06 | −2.416E−07 |
| 13 | −2.295E−04 | −1.646E−05 | 6.112E−06 | −5.523E−07 | 1.771E−08 |
| 14 | −4.587E−04 | 5.899E−05 | −4.487E−06 | 1.837E−07 | −3.118E−09 |
| 15 | −1.544E−04 | 1.814E−05 | −1.209E−06 | 4.266E−08 | −6.204E−10 |
| 16 | −1.310E−04 | 8.551E−06 | −3.398E−07 | 7.548E−09 | −7.217E−11 |
| 17 | −3.273E−05 | 1.819E−06 | −6.213E−08 | 1.195E−09 | −9.910E−12 |

The values of the respective conditional expressions are as follows:

f2/f=−2.23
f4/f=12.98
f3/f1=4.21
f3/f=3.65
f34/f=2.88
D34/f=0.051
D45/D34=2.88
f56/f=−1.77
f7/f=3.06
T7/T8=0.63
f8/f7=−1.62
R8f/R8r=1.24
TL/f=1.1
TL/Hmax=1.44

Accordingly, the imaging lens according to the Example 1 satisfies the above-described conditional expressions.

Figure 2:
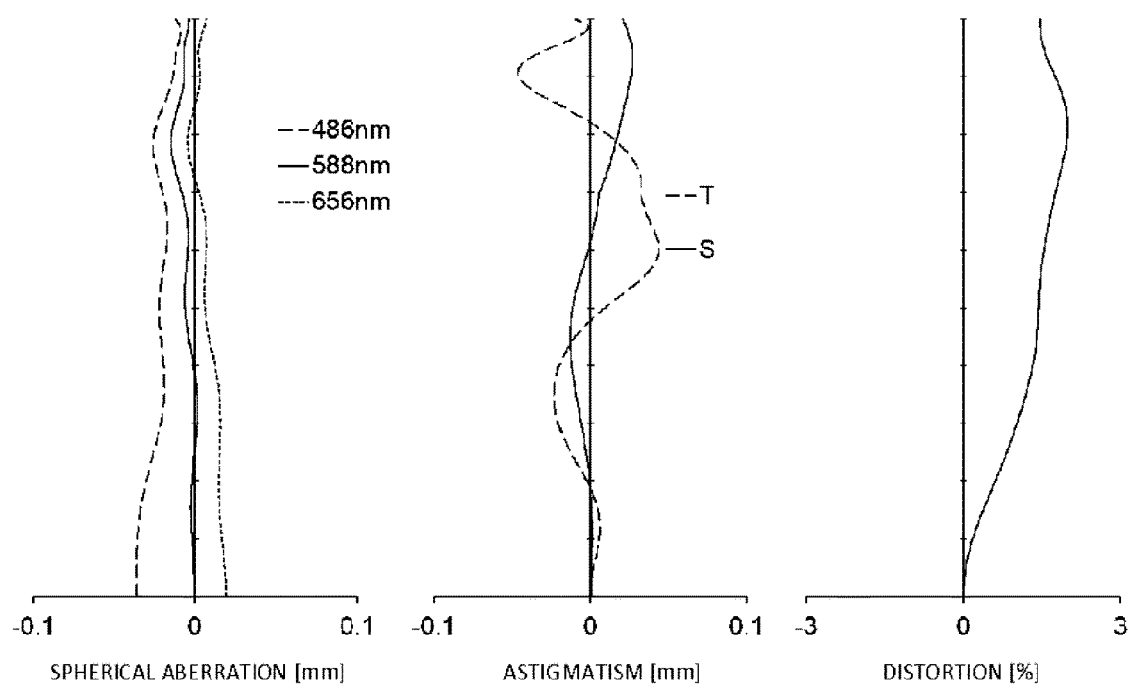
FIG. 2 is an aberration diagram showing spherical aberration, astigmatism, and distortion of the imaging lens of FIG. 1.
Figure 3:
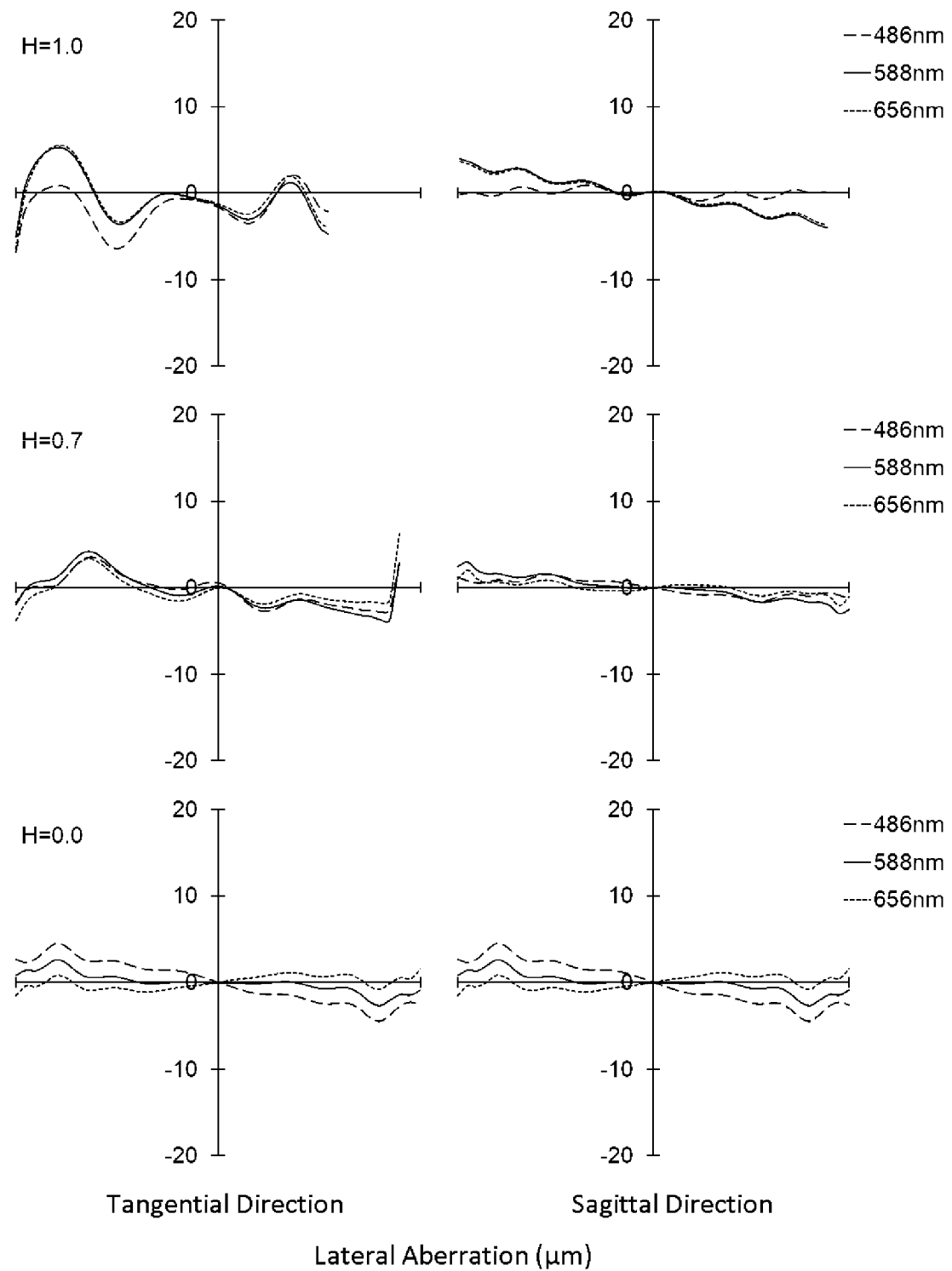
FIG. 3 is an aberration diagram showing a lateral aberration of the imaging lens of FIG. 1.
Figure 4:
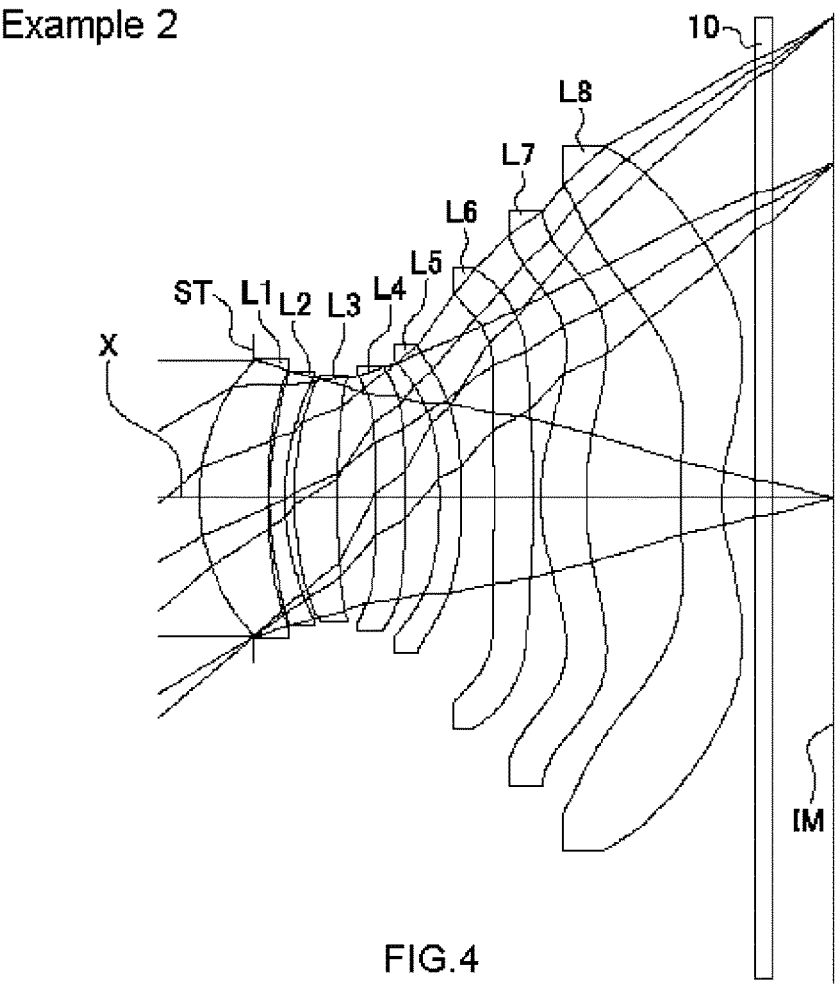
FIG. 4 is a sectional view of a schematic configuration of an imaging lens in Example 2 of the present invention.

FIG. 2 shows spherical aberration (mm), astigmatism (mm), and distortion (%) of the imaging lens in Example 1, respectively. The astigmatism diagram and distortion diagram show aberrations at the reference wavelength (588 nm). Furthermore, in the astigmatism diagram, a sagittal image surface (S) and a tangential image surface (T) are shown respectively (same for FIGS. 5, 8, 11 and 14). FIG. 3 shows a lateral aberration corresponding to a ratio H of each image height to the maximum image height Hmax (hereinafter referred to as "image height ratio H"), which is divided into a tangential direction and a sagittal direction (same for FIGS. 6, 9, 12 and 15). As shown in FIGS. 2 and 3, according to the imaging lens of Example 1, aberrations can be properly corrected.

Example 2

The basic lens data is shown below in Table 3.

TABLE 3 f = 6.69 mm  Fno = 2.0  ω = 40.9°

| | i | r | d | n d | v d | [mm] |
|---|---|---|---|---|---|---|
| ST | 1 | ∞ | −0.655 | | | |
| L1 | 2* | 2.585 | 0.82 | 1.5445 | 56.4 | f1 = 8.218 |
| | 3* | 5.434 | 0.022 | | | |
| L2 | 4* | 3.495 | 0.191 | 1.6707 | 19.2 | f2 = −22.474 |
| | 5* | 2.775 | 0.125 | | | |
| L3 | 6* | 5.143 | 0.513 | 1.5445 | 56.4 | f3 = 20.025 |
| | 7* | 9.392 | 0.482 | | | |
| L4 | 8* | 103.655 | 0.364 | 1.5445 | 56.4 | f4 = 102.878 |
| | 9* | −121.714 | 0.419 | | | |
| L5 | 10* | −9.853 | 0.260 | 1.6707 | 19.2 | f5 = −30.066 |
| | 11* | −19.471 | 0.411 | | | |
| L6 | 12* | −7.766 | 0.490 | 1.5348 | 55.7 | f6 = 100.413 |
| | 13* | −6.933 | 0.079 | | | |
| L7 | 14* | 2.628 | 0.563 | 1.5348 | 55.7 | f7 = 11.851 |
| | 15* | 4.155 | 1.149 | | | |
| L8 | 16* | 4.228 | 0.519 | 1.5348 | 55.7 | f8 = −7.698 |
| | 17* | 1.997 | 0.400 | | | |
| | 18 | ∞ | 0.210 | 1.5168 | 64.2 | |
| | 19 | ∞ | 0.751 | | | |
| (IM) | | ∞ | | | | | f34=16.941 mm
f56=−44.962 mm
R8f=4.228 mm
R8r=1.997 mm
D34=0.482 mm
D45=0.419 mm
T7=0.563 mm
T8=0.519 mm
TL=7.703 mm
Hmax=5.8 mm

TABLE 4

Aspheric Surface Data

| i | k | A4 | A6 | A8 | A10 |
|---|---|---|---|---|---|
| 2 | −6.055E−01 | 3.707E−03 | 4.939E−03 | −1.378E−04 | −6.307E−03 |
| 3 | 0.000E+00 | −2.657E−02 | 4.692E−02 | −3.560E−02 | 8.792E−03 |
| 4 | −2.210E+00 | −4.833E−02 | 5.141E−02 | −4.288E−02 | 1.431E−02 |
| 5 | −2.127E+00 | −1.100E−02 | 1.224E−02 | −3.182E−02 | 5.815E−02 |
| 6 | 0.000E+00 | 1.704E−02 | −1.715E−02 | 3.027E−02 | −2.228E−02 |
| 7 | 0.000E+00 | −6.580E−03 | 2.696E−02 | −5.781E−02 | 7.272E−02 |
| 8 | 0.000E+00 | −3.435E−02 | 4.811E−03 | −1.340E−02 | 1.362E−02 |
| 9 | 0.000E+00 | −4.149E−02 | 1.581E−02 | −1.153E−02 | −6.700E−03 |
| 10 | 0.000E+00 | −1.030E−01 | 4.816E−02 | −1.936E−02 | −1.150E−03 |
| 11 | 0.000E+00 | −9.360E−02 | 5.020E−02 | −2.636E−02 | 4.923E−03 |
| 12 | 0.000E+00 | 4.680E−02 | 8.131E−04 | −1.411E−02 | 8.019E−03 |
| 13 | 0.000E+00 | 1.339E−02 | 1.446E−02 | −9.965E−03 | 2.445E−03 |
| 14 | −1.836E+00 | −3.024E−02 | 1.073E−02 | −6.608E−03 | 2.215E−03 |
| 15 | 0.000E+00 | −5.719E−03 | −2.190E−03 | −1.520E−03 | 7.356E−04 |
| 16 | −1.992E+00 | −1.008E−01 | 3.104E−02 | −7.601E−03 | 1.256E−03 |
| 17 | −6.003E+00 | −4.582E−02 | 1.247E−02 | −2.671E−03 | 3.714E−04 |

| i | A12 | A14 | A16 | A18 | A20 |
|---|---|---|---|---|---|
| 2 | 8.227E−03 | −4.960E−03 | 1.616E−03 | −2.732E−04 | 1.862E−05 |
| 3 | 8.270E−03 | −8.509E−03 | 3.506E−03 | −7.266E−04 | 6.152E−05 |
| 4 | 6.598E−03 | −8.405E−03 | 3.496E−03 | −6.994E−04 | 5.696E−05 |
| 5 | −6.385E−02 | 4.277E−02 | −1.696E−02 | 3.637E−03 | −3.210E−04 |
| 6 | 3.250E−03 | 6.584E−03 | −4.789E−03 | 1.320E−03 | −1.315E−04 |
| 7 | −5.156E−02 | 1.905E−02 | −2.154E−03 | −6.645E−04 | 1.674E−04 |
| 8 | −9.216E−03 | 1.266E−03 | 2.100E−03 | −1.176E−03 | 1.905E−04 |
| 9 | 1.908E−02 | −1.663E−02 | 7.505E−03 | −1.750E−03 | 1.674E−04 |
| 10 | 7.022E−03 | −3.996E−03 | 1.010E−03 | −1.018E−04 | 4.444E−07 |
| 11 | 3.369E−03 | −2.486E−03 | 6.969E−04 | −9.276E−05 | 4.880E−06 |

TABLE 4-continued

Aspheric Surface Data

| 12 | −2.637E−03 | 5.729E−04 | −8.153E−05 | 6.783E−06 | −2.440E−07 |
| 13 | −2.294E−04 | −1.666E−05 | 6.110E−06 | −5.500E−07 | 1.740E−08 |
| 14 | −4.587E−04 | 5.899E−05 | −4.487E−06 | 1.837E−07 | −3.121E−09 |
| 15 | −1.544E−04 | 1.813E−05 | −1.209E−06 | 4.267E−08 | −6.211E−10 |
| 16 | −1.310E−04 | 8.550E−06 | −3.398E−07 | 7.545E−09 | −7.197E−11 |
| 17 | −3.271E−05 | 1.819E−06 | −6.214E−08 | 1.195E−09 | −9.982E−12 |

The values of the respective conditional expressions are as follows:
f2/f=−3.36
f4/f=15.38
f3/f1=2.44
f3/f=2.99
f34/f=2.53
D34/f=0.072
D45/D34=0.87
f56/f=−6.72
f7/f=1.77
T7/T8=1.09
f8/f7=−0.65
R8f/R8r=2.12
TL/f=1.2
TL/Hmax=1.33

Accordingly, the imaging lens according to the Example 2 satisfies the above-described conditional expressions.

Figure 5:
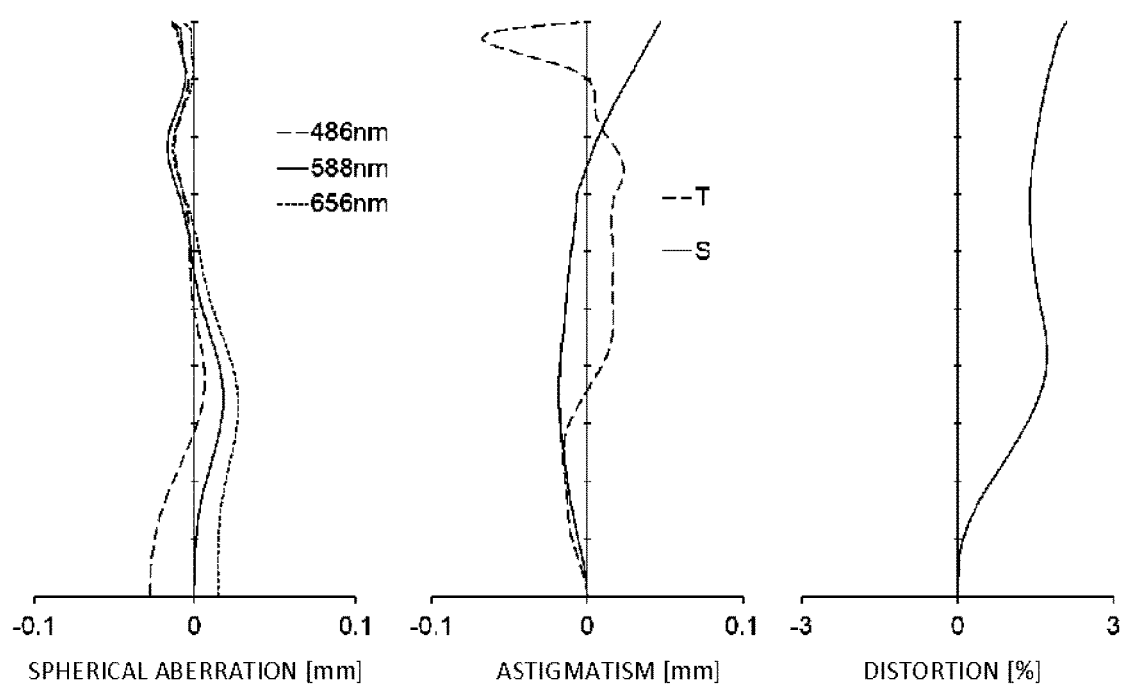
FIG. 5 is an aberration diagram showing spherical aberration, astigmatism, and distortion of the imaging lens of FIG. 4.
Figure 6:
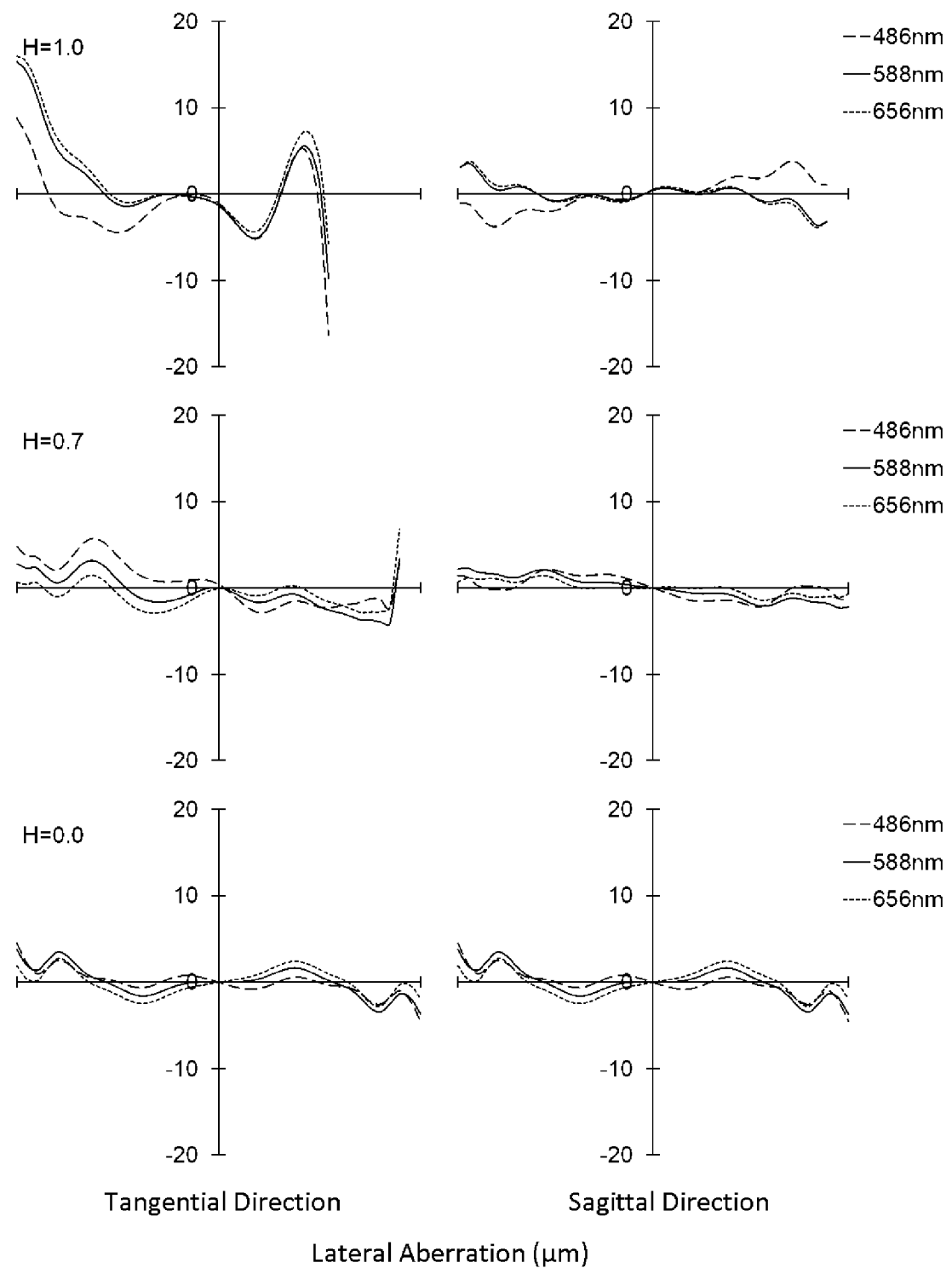
FIG. 6 is an aberration diagram showing a lateral aberration of the imaging lens of FIG. 4.
Figure 7:
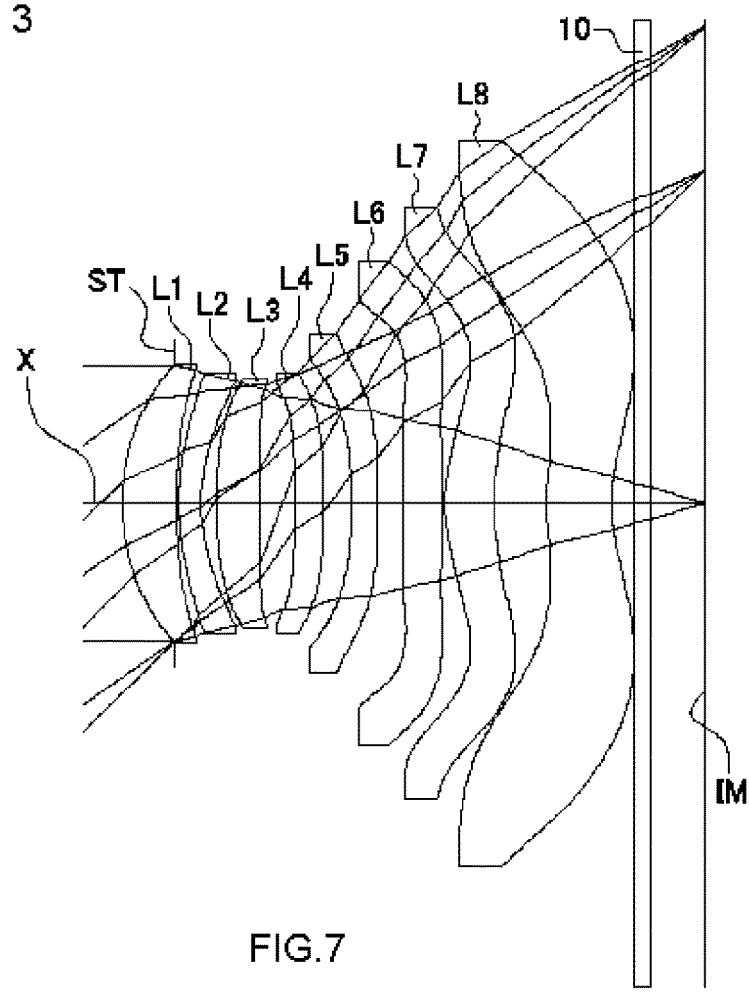
FIG. 7 is a sectional view of a schematic configuration of an imaging lens in Example 3 of the present invention.

FIG. 5 shows spherical aberration (mm), astigmatism (mm), and distortion (%), respectively. FIG. 6 shows a lateral aberration corresponding to the image height ratio H. As shown in FIGS. 5 and 6, according to the imaging lens of the Example 2, aberrations can be properly corrected.

Example 3

The basic lens data is shown below in Table 5.

TABLE 5 f = 5.83 mm Fno = 1.7 ω = 44.9°

| | i | r | d | n d | v d | [mm] |
|---|---|---|---|---|---|---|
| | | ∞ | ∞ | | | |
| ST | 1 | ∞ | −0.650 | | | |
| L1 | 2* | 2.659 | 0.674 | 1.5445 | 56.4 | f1 = 7.776 |
| | 3* | 6.510 | 0.030 | | | |

TABLE 5-continued f = 5.83 mm Fno = 1.7 ω = 44.9°

| | i | r | d | n d | v d | [mm] |
|---|---|---|---|---|---|---|
| L2 | 4* | 2.986 | 0.280 | 1.6707 | 19.2 | f2 = −19.574 |
| | 5* | 2.341 | 0.192 | | | |
| L3 | 6* | 5.974 | 0.535 | 1.5445 | 56.4 | f3 = 13.016 |
| | 7* | 36.861 | 0.445 | | | |
| L4 | 8* | −28.076 | 0.355 | 1.5445 | 56.4 | f4 = 66.620 |
| | 9* | −15.897 | 0.332 | | | |
| L5 | 10* | −17.820 | 0.333 | 1.6707 | 19.2 | f5 = −26.009 |
| | 11* | 837.368 | 0.329 | | | |
| L6 | 12* | −10.377 | 0.479 | 1.6142 | 25.6 | f6 = −90.353 |
| | 13* | −12.987 | 0.030 | | | |
| L7 | 14* | 2.517 | 0.610 | 1.5348 | 55.7 | f7 = 11.204 |
| | 15* | 3.974 | 0.656 | | | |
| L8 | 16* | 4.214 | 0.791 | 1.5348 | 55.7 | f8 = −8.018 |
| | 17* | 1.986 | 0.289 | | | |
| | 18 | ∞ | 0.210 | 1.5168 | 64.2 | |
| | 19 | ∞ | 0.656 | | | |
| (IM) | | ∞ | | | | | f34=11.081 mm
f56=−20.326 mm
R8f=4.214 mm
R8r=1.986 mm
D34=0.445 mm
D45=0.332 mm
T7=0.610 mm
T8=0.791 mm
TL=7.154 mm
Hmax=5.8 mm

TABLE 6

Aspheric Surface Data

| i | k | A4 | A6 | A8 | A10 |
|---|---|---|---|---|---|
| 2 | −7.520E−01 | 3.902E−03 | 4.606E−03 | −1.164E−04 | −6.369E−03 |
| 3 | 0.000E+00 | −2.466E−02 | 4.699E−02 | −3.521E−02 | 8.615E−03 |
| 4 | −1.589E+00 | −4.694E−02 | 5.329E−02 | −4.379E−02 | 1.420E−02 |
| 5 | −1.765E+00 | −9.019E−03 | 1.273E−02 | −3.189E−02 | 5.798E−03 |
| 6 | 0.000E+00 | 1.965E−02 | −1.669E−02 | 3.057E−02 | −2.216E−02 |
| 7 | 0.000E+00 | −4.819E−03 | 2.649E−02 | −5.784E−02 | 7.297E−02 |
| 8 | 0.000E+00 | −2.821E−02 | 4.069E−03 | −1.404E−02 | 1.378E−02 |
| 9 | 0.000E+00 | −4.126E−02 | 1.588E−02 | −1.142E−02 | −6.728E−03 |
| 10 | 0.000E+00 | −9.961E−02 | 5.036E−02 | −1.903E−02 | −1.269E−03 |
| 11 | 0.000E+00 | −8.929E−02 | 5.118E−02 | −2.638E−02 | 4.890E−03 |
| 12 | 0.000E+00 | 4.817E−02 | −3.709E−04 | −1.396E−02 | 8.024E−03 |
| 13 | 0.000E+00 | 1.150E−02 | 1.471E−02 | −1.001E−02 | 2.446E−03 |
| 14 | −2.190E+00 | −3.089E−02 | 1.079E−02 | −6.606E−03 | 2.214E−03 |
| 15 | 0.000E+00 | −5.567E−03 | −2.322E−03 | −1.524E−03 | 7.356E−04 |
| 16 | −1.239E+00 | −1.001E−01 | 3.108E−02 | −7.602E−03 | 1.256E−03 |
| 17 | −5.498E+00 | −4.357E−09 | 1.939E−09 | −9.679E−03 | 3.719E−04 |

TABLE 6-continued

Aspheric Surface Data

| i | A12 | A14 | A16 | A18 | A20 |
|---|---|---|---|---|---|
| 2 | 8.227E-03 | -4.958E-03 | 1.616E-03 | -2.734E-04 | 1.850E-05 |
| 3 | 8.211E-03 | -8.511E-03 | 3.513E-03 | -7.252E-04 | 6.076E-05 |
| 4 | 6.622E-03 | -8.400E-03 | 3.494E-03 | -7.008E-04 | 5.688E-05 |
| 5 | -6.394E-02 | 4.275E-02 | -1.696E-02 | 3.638E-03 | -3.234E-04 |
| 6 | 3.252E-03 | 6.568E-03 | -4.793E-03 | 1.318E-03 | -1.319E-04 |
| 7 | -5.147E-02 | 1.903E-02 | -2.141E-03 | -6.553E-04 | 1.650E-04 |
| 8 | -9.122E-03 | 1.268E-03 | 2.096E-03 | -1.172E-03 | 1.907E-04 |
| 9 | 1.908E-02 | -1.663E-02 | 7.507E-03 | -1.748E-03 | 1.676E-04 |
| 10 | 7.003E-03 | -4.000E-03 | 1.007E-03 | -1.013E-04 | 7.531E-07 |
| 11 | 3.361E-03 | -2.487E-03 | 6.968E-04 | -9.280E-05 | 4.839E-06 |
| 12 | -2.639E-03 | 5.725E-04 | -8.157E-05 | 6.786E-06 | -2.424E-07 |
| 13 | -2.291E-04 | -1.664E-05 | 6.111E-06 | -5.499E-07 | 1.739E-08 |
| 14 | -4.588E-04 | 5.899E-05 | -4.487E-06 | 1.837E-07 | -3.119E-09 |
| 15 | -1.544E-04 | 1.813E-05 | -1.209E-06 | 4.267E-08 | -6.210E-10 |
| 16 | -1.310E-04 | 8.550E-06 | -3.398E-07 | 7.546E-09 | -7.194E-11 |
| 17 | -3.271E-05 | 1.819E-06 | -6.211E-08 | 1.196E-09 | -1.002E-11 |

The values of the respective conditional expressions are as follows:
f2/f=-3.36
f4/f=11.43
f3/f1=1.67
f3/f=2.23
f34/f=1.90
D34/f=0.076
D45/D34=0.75
f56/f=-3.49
f7/f=1.92
T7/T8=0.77
f8/f7=-0.72
R8f/R8r=2.12
TL/f=1.2
TL/Hmax=1.23

Accordingly, the imaging lens according to the Example 3 satisfies the above-described conditional expressions.

Figure 8:
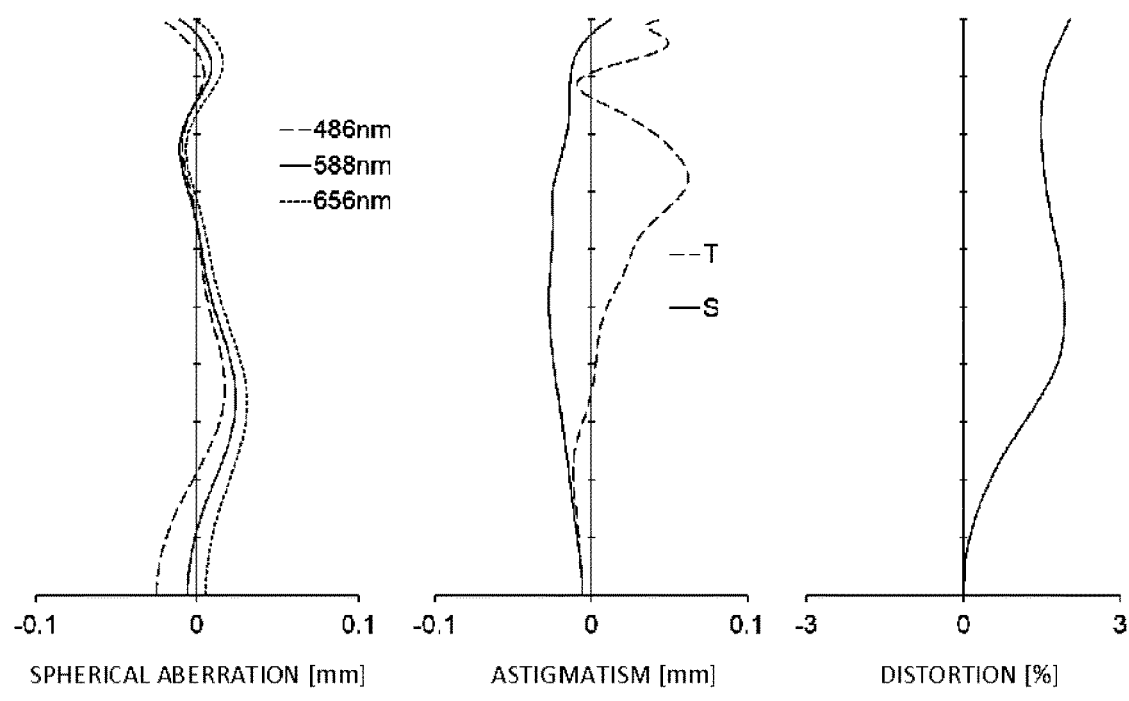
FIG. 8 is an aberration diagram showing spherical aberration, astigmatism, and distortion of the imaging lens of FIG. 7.
Figure 9:
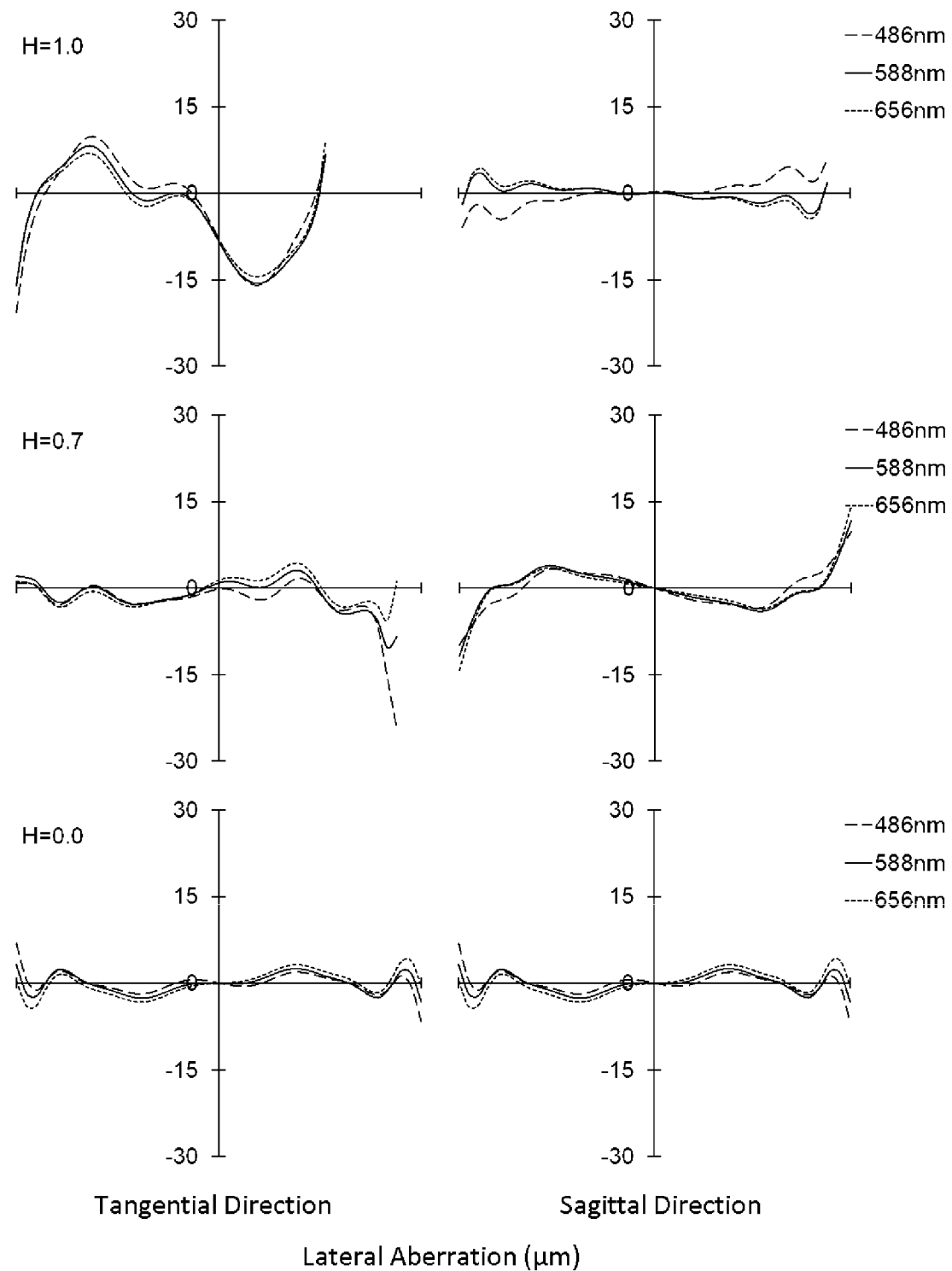
FIG. 9 is an aberration diagram showing a lateral aberration of the imaging lens of FIG. 7.
Figure 10:
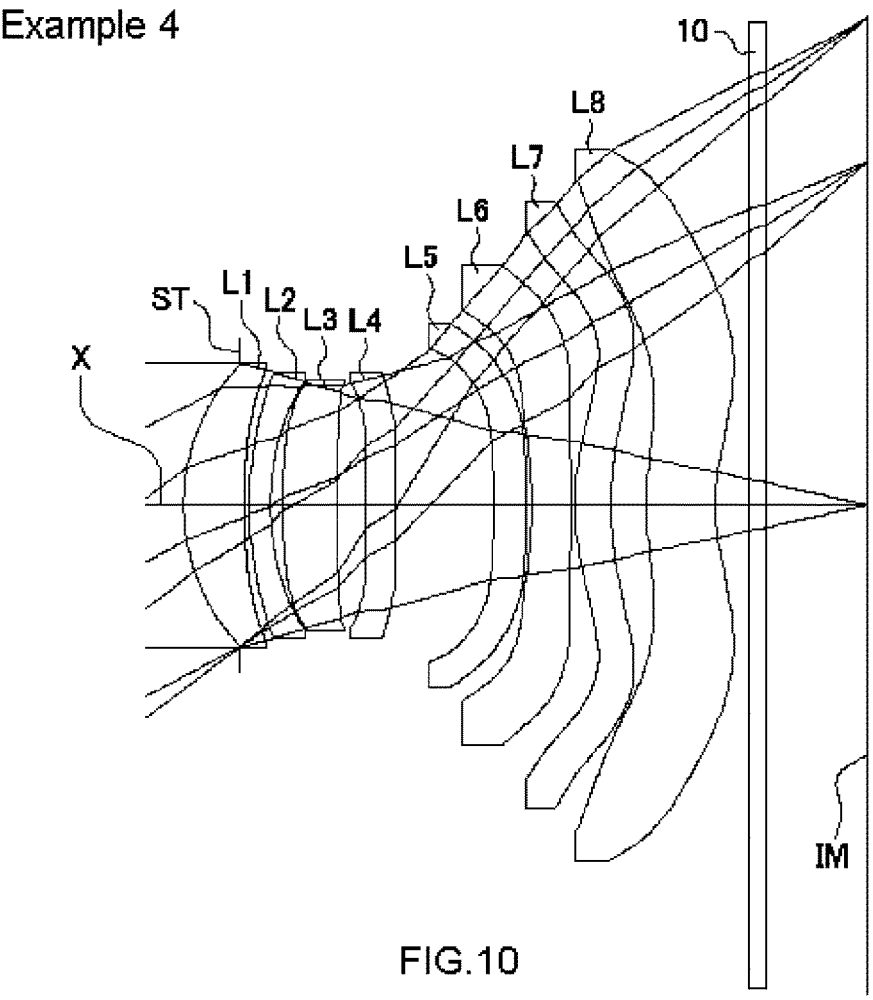
FIG. 10 is a sectional view of a schematic configuration of an imaging lens in Example 4 of the present invention.

FIG. 8 shows spherical aberration (mm), astigmatism (mm), and distortion (%), respectively. FIG. 9 shows a lateral aberration corresponding to the image height ratio H. As shown in FIGS. 8 and 9, according to the imaging lens of the Example 3, aberrations can be properly corrected.

Example 4

The basic lens data is shown below in Table 7.

TABLE 7 f = 7.60 mm Fno = 2.2 ω = 37.2°

| | i | r | d | n d | v d | [mm] |
|---|---|---|---|---|---|---|
| ST | 1 | ∞ | ∞ | | | |
| | | ∞ | -0.661 | | | |
| L1 | 2* | 2.485 | 0.723 | 1.5445 | 56.4 | f1 = 6.70 |
| | 3* | 6.983 | 0.052 | | | |
| L2 | 4* | 3.638 | 0.248 | 1.6707 | 19.2 | f2 = -16.322 |
| | 5* | 2.656 | 0.151 | | | |
| L3 | 6* | 7.272 | 0.650 | 1.5445 | 56.4 | f3 = 23.501 |
| | 7* | 16.316 | 0.343 | | | |
| L4 | 8* | 20.488 | 0.362 | 1.5445 | 56.4 | f4 = 102.837 |
| | 9* | 32.109 | 1.181 | | | |
| L5 | 10* | ∞ | 0.390 | 1.6707 | 19.2 | f5 = ∞ |
| | 11* | ∞ | 0.058 | | | |
| L6 | 12* | -4.608 | 0.468 | 1.5348 | 55.7 | f6 = -10.342 |
| | 13* | -28.593 | 0.049 | | | |
| L7 | 14* | 2.990 | 0.432 | 1.5348 | 55.7 | f7 = 17.952 |
| | 15* | 4.124 | 0.424 | | | |
| L8 | 16* | 3.079 | 0.833 | 1.5348 | 55.7 | f8 = -31.972 |
| | 17* | 2.363 | 0.400 | | | |
| | 18 | ∞ | 0.210 | 1.5168 | 64.2 | |
| | 19 | ∞ | 1.203 | | | |
| (IM) | | ∞ | | | | | f34=19.232 mm f56=-10.342 mm

R8f=3.079 mm

R8r=2.363 mm

D34=0.343 mm

D45=1.181 mm

T7=0.432 mm

T8=0.833 mm

TL=8.105 mm

Hmax=5.8 mm

TABLE 8

Aspheric Surface Data

| i | k | A4 | A6 | A8 | A10 |
|---|---|---|---|---|---|
| 2 | -6.542E-01 | 3.605E-03 | 4.845E-03 | 2.438E-04 | -6.635E-03 |
| 3 | 0.000E+00 | -2.208E-02 | 4.662E-02 | -3.533E-02 | 8.881E-03 |
| 4 | -1.103E+00 | -4.583E-02 | 5.260E-02 | -4.220E-02 | 1.397E-02 |
| 5 | -3.129E+00 | -3.092E-03 | 1.648E-02 | -3.428E-02 | 5.852E-02 |
| 6 | 0.000E+00 | 1.922E-02 | -1.649E-02 | 3.003E-02 | -2.187E-02 |
| 7 | 0.000E+00 | -1.177E-02 | 2.833E-02 | -5.718E-02 | 7.206E-02 |
| 8 | 0.000E+00 | -4.389E-02 | 2.911E-03 | -1.163E-02 | 1.459E-02 |

TABLE 8-continued

Aspheric Surface Data

| | | | | |
|---|---|---|---|---|
| 9 | 0.000E+00 | −3.798E−02 | 9.842E−03 | −8.309E−03 | −6.789E−03 |
| 10 | 0.000E+00 | −7.911E−02 | 3.437E−02 | −1.733E−02 | −9.883E−04 |
| 11 | 0.000E+00 | −8.547E−02 | 4.806E−02 | −2.641E−02 | 4.863E−03 |
| 12 | 0.000E+00 | 4.212E−02 | 6.244E−05 | −1.368E−02 | 8.020E−03 |
| 13 | 0.000E+00 | −1.726E−03 | 1.560E−02 | −9.902E−03 | 2.420E−03 |
| 14 | −1.447E+00 | −2.880E−02 | 1.054E−02 | −6.620E−03 | 2.216E−03 |
| 15 | 0.000E+00 | −2.852E−03 | −2.414E−03 | −1.523E−03 | 7.357E−04 |
| 16 | −9.412E−01 | −9.852E−02 | 3.072E−02 | −7.603E−03 | 1.257E−03 |
| 17 | −5.790E+00 | −4.618E−02 | 1.232E−02 | −2.638E−03 | 3.705E−04 |

| i | A12 | A14 | A16 | A18 | A20 |
|---|---|---|---|---|---|
| 2 | 8.275E−03 | −4.936E−03 | 1.613E−03 | −2.752E−04 | 1.867E−05 |
| 3 | 8.245E−03 | −8.521E−03 | 3.505E−03 | −7.272E−04 | 6.191E−05 |
| 4 | 6.543E−03 | −8.381E−03 | 3.502E−03 | −7.023E−04 | 5.741E−05 |
| 5 | −6.350E−02 | 4.275E−02 | −1.700E−02 | 3.638E−03 | −3.199E−04 |
| 6 | 3.335E−03 | 6.622E−03 | −4.783E−03 | 1.311E−03 | −1.320E−04 |
| 7 | −5.130E−02 | 1.912E−02 | −2.181E−03 | −6.695E−04 | 1.711E−04 |
| 8 | −9.492E−03 | 1.146E−02 | 2.123E−03 | −1.162E−03 | 1.894E−04 |
| 9 | 1.907E−02 | −1.664E−02 | 7.491E−03 | −1.749E−03 | 1.689E−04 |
| 10 | 6.926E−03 | −4.013E−03 | 1.006E−03 | −1.032E−04 | 1.515E−06 |
| 11 | 3.372E−03 | −2.488E−03 | 6.954E−04 | −9.305E−05 | 4.937E−06 |
| 12 | −2.654E−03 | 5.707E−04 | −8.149E−05 | 6.840E−06 | −2.366E−07 |
| 13 | −2.291E−04 | −1.647E−05 | 6.108E−06 | −5.525E−07 | 1.775E−08 |
| 14 | −4.587E−04 | 5.899E−05 | −4.487E−06 | 1.837E−07 | −3.117E−09 |
| 15 | −1.544E−04 | 1.813E−05 | −1.209E−06 | 4.267E−08 | −6.207E−10 |
| 16 | −1.310E−04 | 8.550E−06 | −3.399E−07 | 7.547E−09 | −7.191E−11 |
| 17 | −3.273E−05 | 1.820E−06 | −6.213E−08 | 1.193E−09 | −9.894E−12 |

The values of the respective conditional expressions are as follows:

f2/f=−2.15
f4/f=13.52
f3/f1=3.50
f3/f=3.09
f34/f=2.53
D34/f=0.045
D45/D34=3.45
f56/f=−1.36
f7/f=2.36
T7/T8=0.52
f8/f7=−1.78
R8f/R8r=1.30
TL/f=1.1
TL/Hmax=1.40

Accordingly, the imaging lens according to the Example 4 satisfies the above-described conditional expressions.

Figure 11:
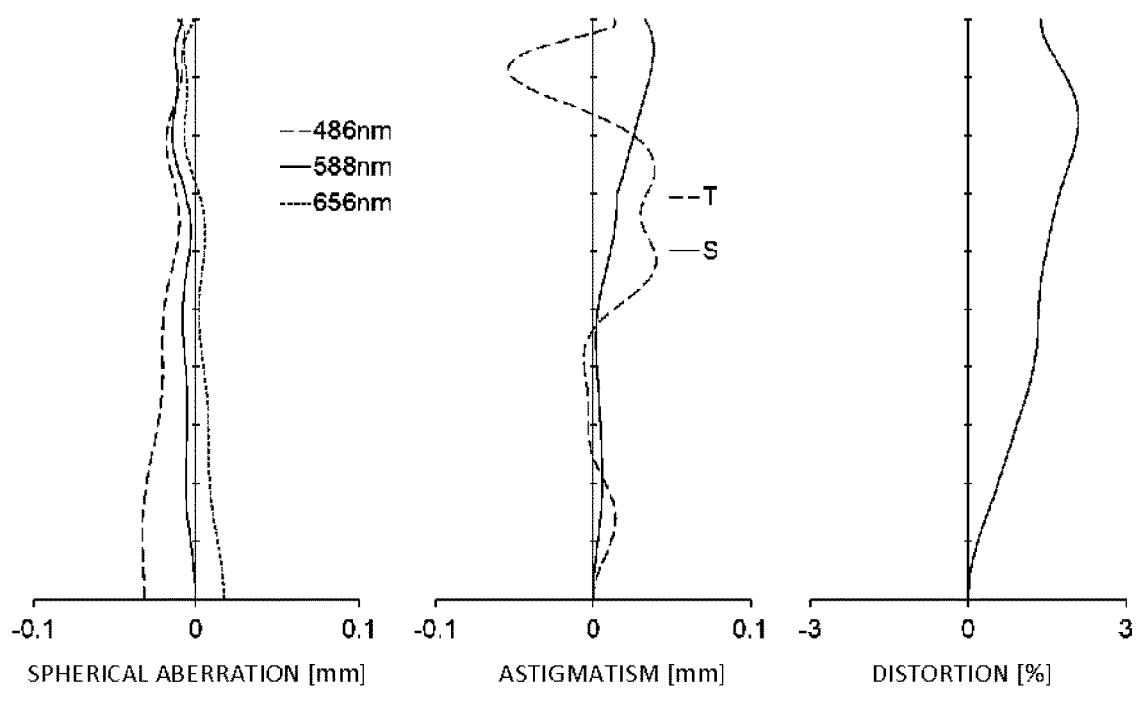
FIG. 11 is an aberration diagram showing spherical aberration, astigmatism, and distortion of the imaging lens of FIG. 10.
Figure 12:
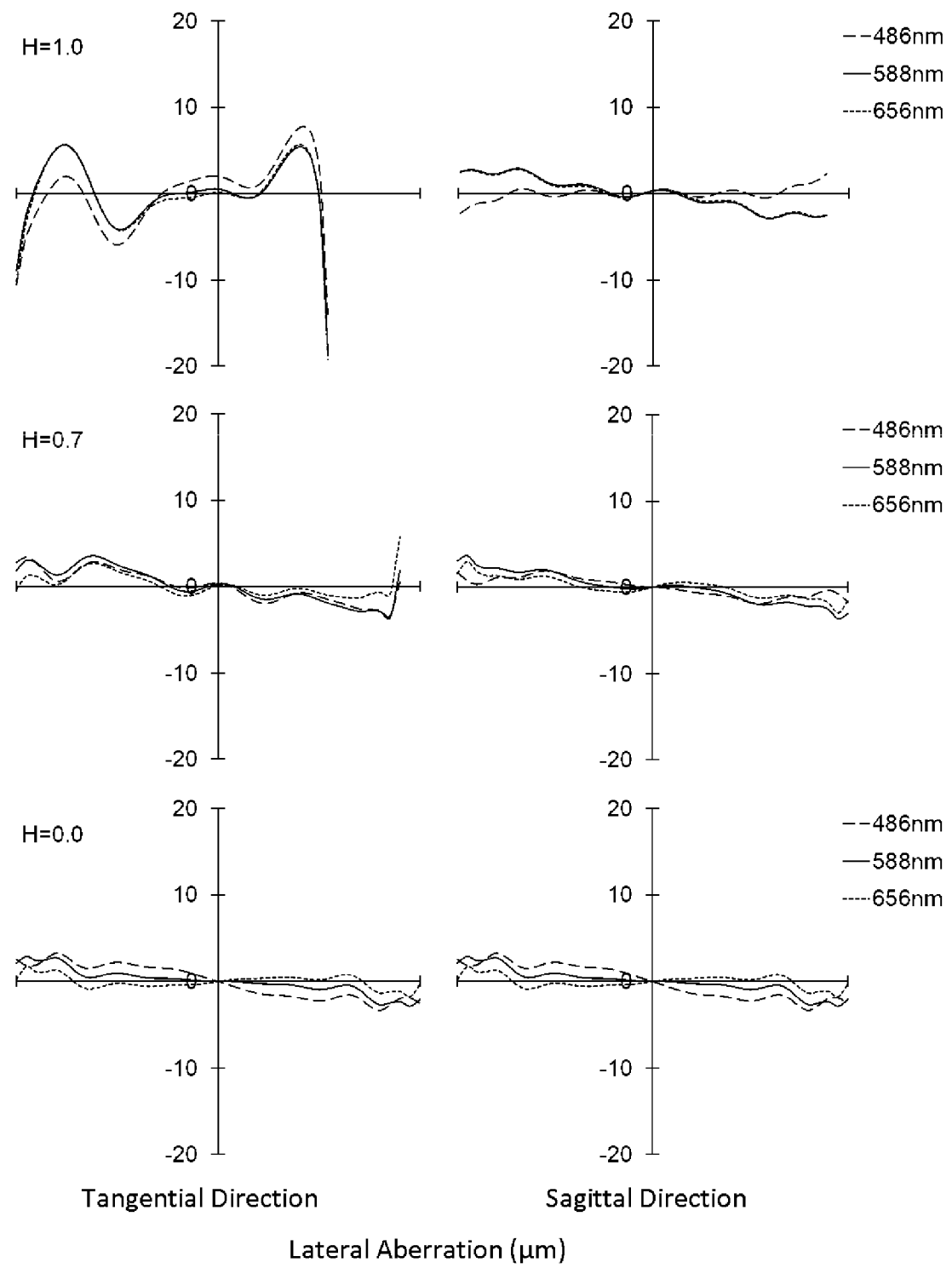
FIG. 12 is an aberration diagram showing a lateral aberration of the imaging lens of FIG. 10.
Figure 13:
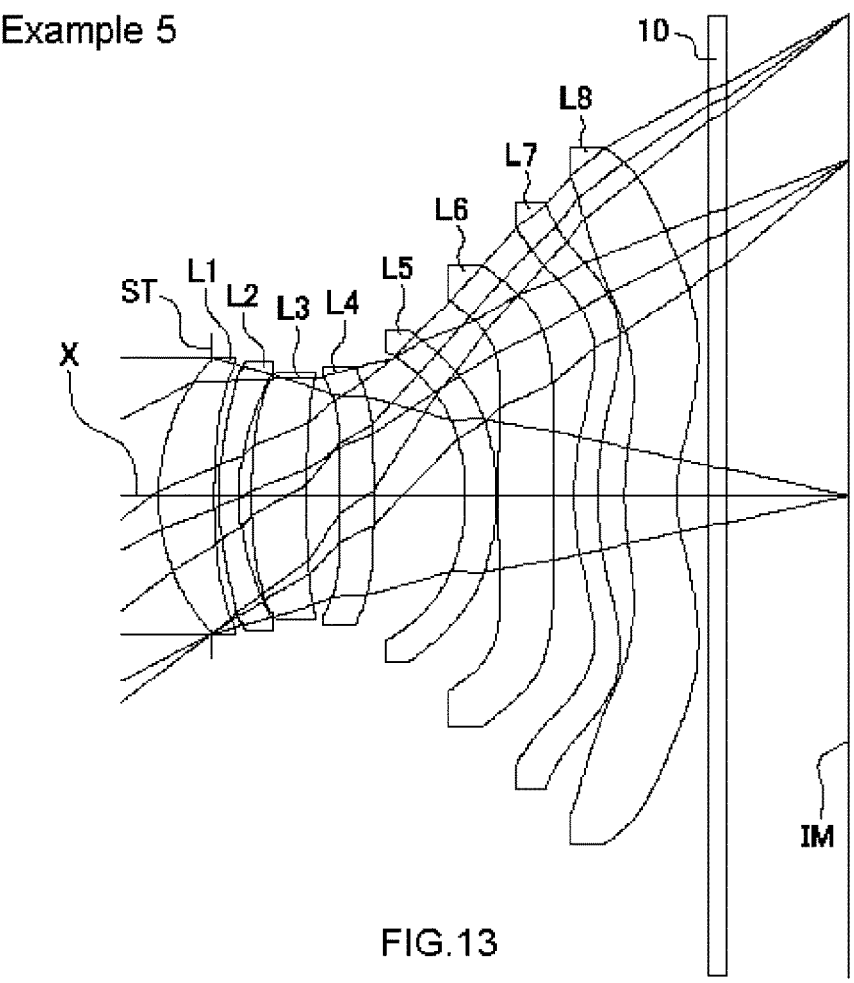
FIG. 13 is a sectional view of a schematic configuration of an imaging lens in Example 5 of the present invention.

FIG. 11 shows spherical aberration (mm), astigmatism (mm), and distortion (%), respectively. FIG. 12 shows a lateral aberration corresponding to the image height ratio H. As shown in FIGS. 11 and 12, according to the imaging lens of the Example 4, aberrations can be properly corrected.

Example 5

The basic lens data is shown below in Table 9.

TABLE 9 f = 7.76 mm Fno = 2.3 ω = 36.8°

| | i | r | d | n d | v d | [mm] |
|---|---|---|---|---|---|---|
| | | ∞ | ∞ | | | |
| ST | 1 | ∞ | −0.649 | | | |
| L1 | 2* | 2.545 | 0.684 | 1.5445 | 56.4 | f1 = 6.969 |
| | 3* | 7.001 | 0.058 | | | |
| L2 | 4* | 3.618 | 0.248 | 1.6707 | 19.2 | f2 = −17.678 |
| | 5* | 2.696 | 0.140 | | | |
| L3 | 6* | 6.706 | 0.682 | 1.5445 | 56.4 | f3 = 27.136 |
| | 7* | 11.839 | 0.416 | | | |
| L4 | 8* | 40.344 | 0.408 | 1.5445 | 56.4 | f4 = 101.857 |
| | 9* | 147.522 | 1.137 | | | |
| L5 | 10* | −3.138 | 0.382 | 1.6707 | 19.2 | f5 = −29.422 |
| | 11* | −3.914 | 0.030 | | | |
| L6 | 12* | ∞ | 0.653 | 1.5348 | 55.7 | f6 = ∞ |
| | 13* | ∞ | 0.269 | | | |
| L7 | 14* | 3.199 | 0.290 | 1.5348 | 55.7 | f7 = 28.927 |
| | 15* | 3.905 | 0.324 | | | |
| L8 | 16* | 2.775 | 0.650 | 1.5348 | 55.7 | f8 = −18.249 |
| | 17* | 1.984 | 0.400 | | | |
| | 18 | ∞ | 0.210 | 1.5168 | 64.2 | |
| | 19 | ∞ | 1.501 | | | |
| (IM) | | ∞ | | | | | f34=21.644 mm
f56=−29.422 mm
R8f=2.775 mm
R8r=1.984 mm
D34=0.416 mm
D45=1.137 mm
T7=0.290 mm
T8=0.650 mm
TL=8.411 mm
Hmax=5.8 mm

TABLE 10

| | | Aspheric Surface Data | | | |
|---|---|---|---|---|---|
| i | k | A4 | A6 | A8 | A10 |
| 2 | −6.750E−01 | 3.242E−03 | 5.397E−03 | −7.409E−05 | −6.511E−03 |
| 3 | 0.000E+00 | −2.287E−02 | 4.682E−02 | −3.540E−02 | 8.902E−03 |
| 4 | −1.254E+00 | −4.586E−02 | 5.230E−02 | −4.232E−02 | 1.405E−02 |
| 5 | −2.965E+00 | −5.271E−03 | 1.553E−02 | −3.381E−02 | 5.845E−02 |
| 6 | 0.000E+00 | 1.915E−02 | −1.671E−02 | 3.028E−02 | −2.199E−02 |
| 7 | 0.000E+00 | −9.347E−03 | 2.795E−02 | −5.730E−02 | 7.226E−02 |
| 8 | 0.000E+00 | −4.399E−02 | 2.156E−03 | −1.180E−02 | 1.436E−02 |
| 9 | 0.000E+00 | −3.865E−02 | 9.646E−03 | −8.779E−03 | −6.671E−03 |
| 10 | 0.000E+00 | −6.881E−02 | 4.024E−02 | −1.958E−02 | −1.151E−03 |
| 11 | 0.000E+00 | −6.804E−02 | 4.500E−02 | −2.647E−02 | 4.961E−03 |
| 12 | 0.000E+00 | 1.596E−02 | 3.235E−03 | −1.376E−02 | 8.013E−03 |
| 13 | 0.000E+00 | −8.480E−03 | 1.599E−02 | −9.867E−03 | 2.419E−03 |
| 14 | −1.364E+00 | −2.918E−02 | 1.041E−02 | −6.618E−03 | 2.216E−03 |
| 15 | 0.000E+00 | −5.820E−03 | −2.264E−03 | −1.526E−03 | 7.355E−04 |
| 16 | −1.002E+00 | −9.966E−02 | 3.088E−02 | −7.606E−03 | 1.256E−03 |
| 17 | −4.956E+00 | −4.767E−02 | 1.263E−02 | −2.653E−03 | 3.707E−04 |
| i | A12 | A14 | A16 | A18 | A20 |
| 2 | 8.268E−03 | −4.943E−03 | 1.615E−03 | −2.745E−04 | 1.844E−05 |
| 3 | 8.254E−03 | −8.521E−03 | 3.503E−03 | −7.272E−04 | 6.199E−05 |
| 4 | 6.557E−03 | −8.388E−03 | 3.499E−03 | −7.017E−04 | 5.744E−05 |
| 5 | −6.357E−02 | 4.277E−02 | −1.699E−02 | 3.634E−03 | −3.196E−04 |
| 6 | 3.305E−03 | 6.607E−03 | −4.784E−03 | 1.316E−03 | −1.332E−04 |
| 7 | −5.141E−02 | 1.908E−02 | −2.167E−03 | −6.623E−04 | 1.666E−04 |
| 8 | −9.420E−03 | 1.183E−03 | 2.114E−03 | −1.167E−03 | 1.902E−04 |
| 9 | 1.908E−02 | −1.664E−02 | 7.492E−03 | −1.749E−03 | 1.688E−04 |
| 10 | 7.007E−03 | −3.994E−03 | 1.011E−03 | −1.022E−04 | 5.181E−07 |
| 11 | 3.383E−03 | −2.488E−03 | 6.952E−04 | −9.309E−05 | 4.939E−06 |
| 12 | −2.651E−03 | 5.713E−04 | −8.140E−05 | 6.838E−06 | −2.457E−07 |
| 13 | −2.296E−04 | −1.649E−05 | 6.110E−06 | −5.523E−07 | 1.775E−08 |
| 14 | −4.587E−04 | 5.899E−05 | −4.487E−06 | 1.837E−07 | −3.118E−09 |
| 15 | −1.544E−04 | 1.814E−05 | −1.209E−06 | 4.266E−08 | −6.207E−10 |
| 16 | −1.310E−04 | 8.550E−06 | −3.398E−07 | 7.548E−09 | −7.209E−11 |
| 17 | −3.273E−05 | 1.819E−06 | −6.213E−08 | 1.195E−09 | −9.931E−12 |

The values of the respective conditional expressions are as follows:

f2/f=−2.28
f4/f=13.13
f3/f1=3.89
f3/f=3.50
f34/f=2.79
D34/f=0.054
D45/D34=2.73
f56/f=−3.79
f7/f=3.73
T7/T8=0.45
f8/f7=−0.63
R8f/R8r=1.40
TL/f=1.1
TL/Hmax=1.45

Accordingly, the imaging lens according to the Example 5 satisfies the above-described conditional expressions.

Figure 14:
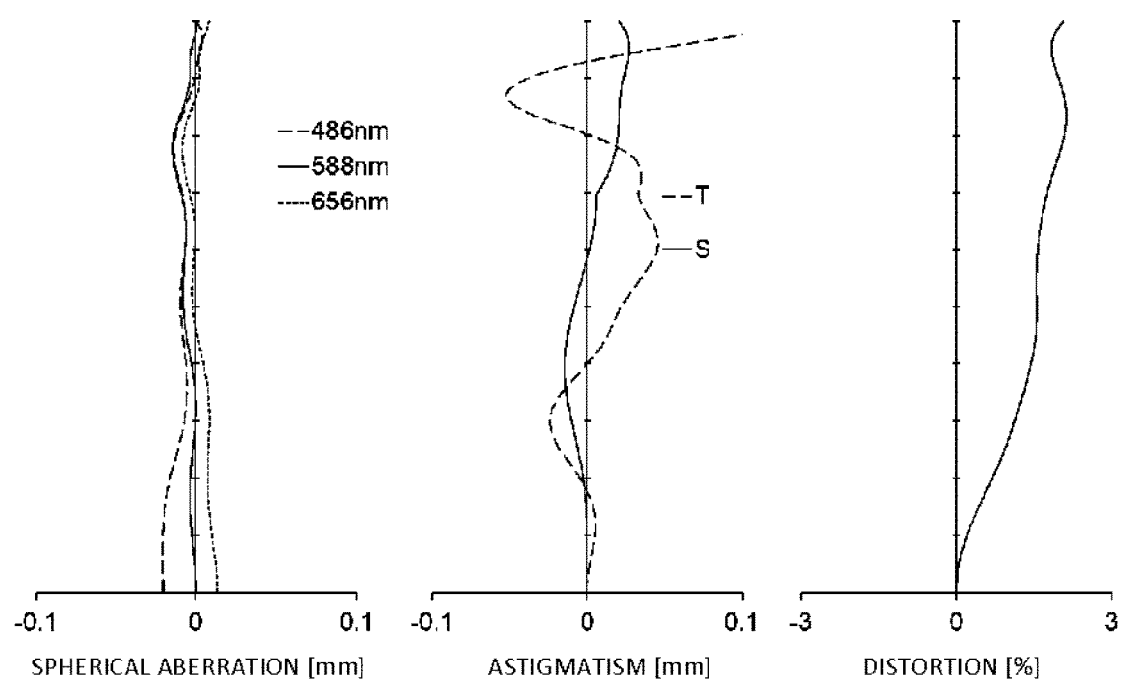
FIG. 14 is an aberration diagram showing spherical aberration, astigmatism, and distortion of the imaging lens of FIG. 13.
Figure 15:
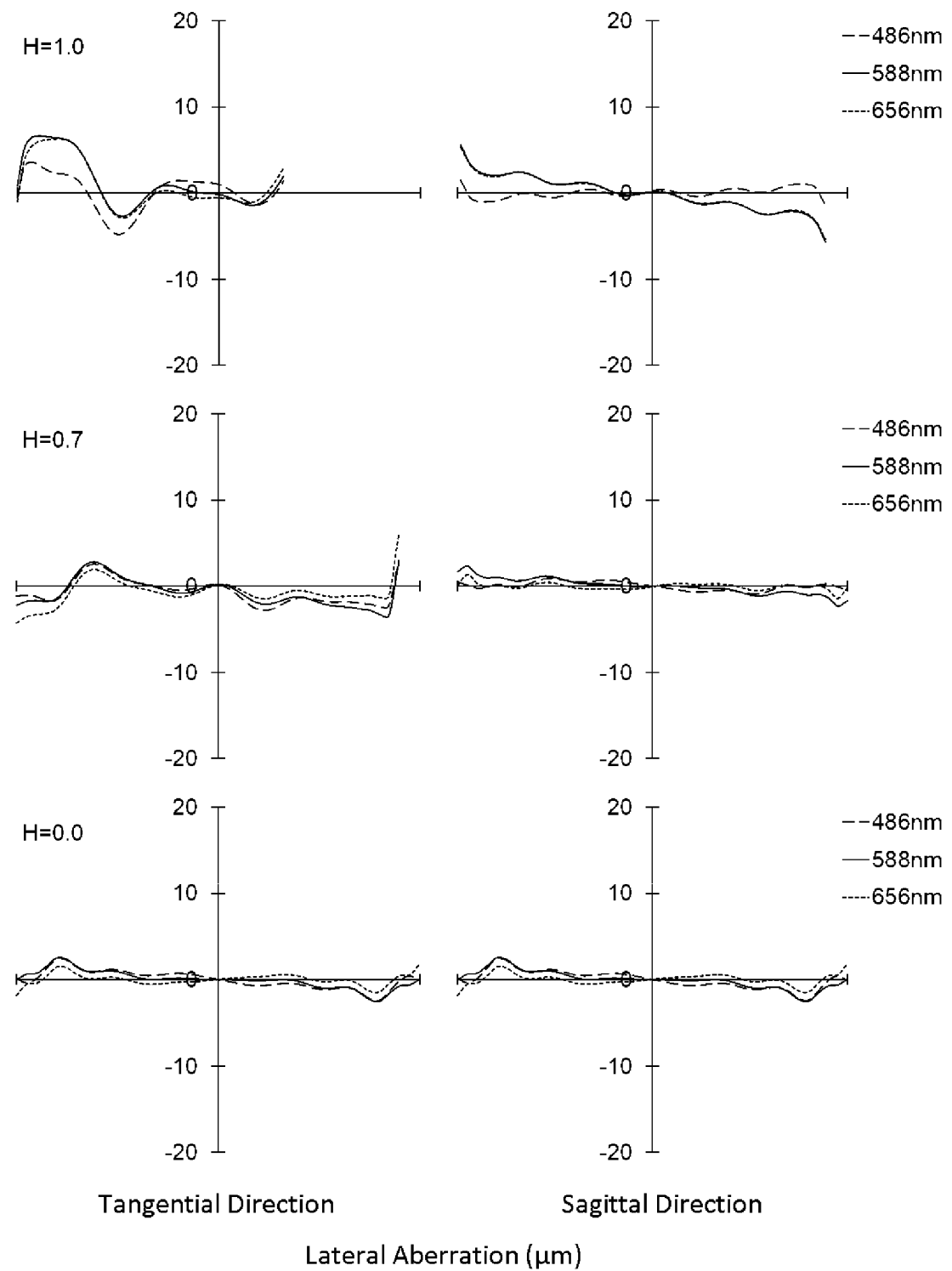
FIG. 15 is an aberration diagram showing a lateral aberration of the imaging lens of FIG. 13.

FIG. 14 shows spherical aberration (mm), astigmatism (mm), and distortion (%), respectively. FIG. 15 shows a lateral aberration corresponding to the image height ratio H. As shown in FIGS. 14 and 15, according to the imaging lens of the Example 5, aberrations can be properly corrected.

As described above, the imaging lens according to the present examples has a very wide field of view (2ω) of 70° or more. More specifically, the imaging lenses of Examples 1 to 5 have fields of view (2ω) of 73.4° to 89.7°. According to the imaging lens of the present embodiments, it is possible to take an image over a wider range than that taken by a conventional imaging lens.

In recent years, with advancement in digital-zoom technology to enlarge any range of an image obtained through an imaging lens by image processing, an image sensor with higher pixel count has been often applied in combination with an imaging lens of higher resolution. In the case of the image sensor with the higher pixel count, a light-receiving area per pixel often decreases, so that an image tends to be dark. The imaging lenses of Examples 1 to 5 have Fnos as small as 1.7 to 2.3. According to the imaging lenses of the present embodiments, it is possible to take a sufficiently bright image responding to the image sensor with the higher pixel count as mentioned above.

Therefore, when the imaging lens of the above-described embodiment is applied in an imaging optical system such as cameras built in mobile devices, namely, smartphones, cellular phones and mobile information terminals, digital still cameras, security cameras, onboard cameras, and network cameras, it is possible to attain both high performance and downsizing of the cameras, and the like.

The present invention is applicable in an imaging lens that is mounted in a relatively small-sized camera, such as cameras built in mobile devices, namely smartphones, cellular phones and mobile information terminals, digital still cameras, security cameras, onboard cameras, and network cameras.

DESCRIPTION OF REFERENCE NUMERALS

X: optical axis
ST: aperture stop
L1: first lens
L2: second lens
L3: third lens

L4: fourth lens
L5: fifth lens
L6: sixth lens
L7: seventh lens
L8: eighth lens
10: filter
IM: image plane

What is claimed is:

1. An imaging lens forming an image of an object on an image sensor and comprising, in order from an object side to an image side,
   a first lens with positive refractive power,
   a second lens with negative refractive power,
   a third lens with positive refractive power,
   a fourth lens with positive refractive power,
   a fifth lens,
   a sixth lens,
   a seventh lens with positive refractive power, and
   an eighth lens with negative refractive power,
   wherein said eighth lens has an aspheric image-side surface having at least one inflection point, and is in a form of a meniscus lens with the image-side surface being concave in the paraxial region, and the following conditional expressions are satisfied:

$$-5.00 < f2/f < -2.00$$

$$10.00 < f4/f < 25.00$$

where
   f: a focal length of the overall optical system of the imaging lens,
   f2: a focal length of the second lens, and
   f4: a focal length of the fourth lens.

2. The imaging lens according to claim 1, wherein the following conditional expression is satisfied:

$$1.20 < f3/f1 < 5.50$$

where
   f1: a focal length of the first lens, and
   f3: a focal length of the third lens.

3. The imaging lens according to claim 1, wherein the following conditional expression is satisfied:

$$1.50 < f34/f < 3.50$$

where
   f34: a composite focal length of the third lens and the fourth lens, and
   f: a focal length of the overall optical system of the imaging lens.

4. The imaging lens according to claim 1, wherein the following conditional expression is satisfied:

$$0.030 < D34/f < 0.100$$

where
   D34: a distance along the optical axis between the third lens and the fourth lens, and
   f: a focal length of the overall optical system of the imaging lens.

5. The imaging lens according to claim 1, wherein the following conditional expression is satisfied:

$$1.40 < f7/f < 4.50$$

where
   f: a focal length of the overall optical system of the imaging lens, and
   f7: a focal length of the seventh lens.

6. The imaging lens according to claim 1, wherein the following conditional expression is satisfied:

$$35 < vd7$$

$$35 < vd8$$

where
   vd7: an abbe number at d-ray of the seventh lens, and
   vd8: an abbe number at d-ray of the eighth lens.

* * * * *